(12) United States Patent
Gerard et al.

(10) Patent No.: US 9,928,540 B1
(45) Date of Patent: Mar. 27, 2018

(54) SYSTEM FOR INTEGRATING COURIER SERVICE WITH CUSTOMER APPLICATIONS

(71) Applicant: Square, Inc., San Francisco, CA (US)

(72) Inventors: Ryan Gerard, San Franicsco, CA (US); Fion Lam, Oakland, CA (US); Keith Chu, Emeryville, CA (US); Jesse L. Reiss, Berkeley, CA (US); Jeffrey F. Iacono, San Francisco, CA (US); Derek Hammer, San Francisco, CA (US); Michael Thole, Portland, OR (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/390,958

(22) Filed: Dec. 27, 2016

(51) Int. Cl.
  *G06Q 30/06* (2012.01)
  *G06Q 10/08* (2012.01)
  *H04L 29/08* (2006.01)

(52) U.S. Cl.
  CPC ....... *G06Q 30/0635* (2013.01); *G06Q 10/083* (2013.01); *H04L 67/18* (2013.01)

(58) Field of Classification Search
  CPC ....................................... G06Q 10/08
  USPC .......................................... 705/330
  See application file for complete search history.

(56) References Cited

U.S. PATENT DOCUMENTS

| | | | |
|---|---|---|---|
| 2002/0143655 A1 | 10/2002 | Elston et al. | |
| 2015/0052000 A1* | 2/2015 | Apsley | G06Q 30/0603 705/26.5 |
| 2017/0270468 A1* | 9/2017 | Natarajan | G06N 5/04 |

* cited by examiner

*Primary Examiner* — Mila Airapetian
(74) *Attorney, Agent, or Firm* — Mattingly & Malur, PC

(57) ABSTRACT

Techniques to enable the integration of a courier service with a customer application. To integrate a courier service with a customer application, a system may receive a plurality of orders that are to be fulfilled by delivery along with a plurality of locations associated with a plurality of courier devices. The system can then generate a proposal for an order that is based on the plurality of orders and the plurality of locations. In some instances, the system generates the proposal to include one or more options for fulfilling the order, such as delivery by a courier, pickup by a customer, or dine-in by the customer. In some instances, the system further determines a cost associated with each of the options and generates the proposal to include the respective costs.

20 Claims, 16 Drawing Sheets

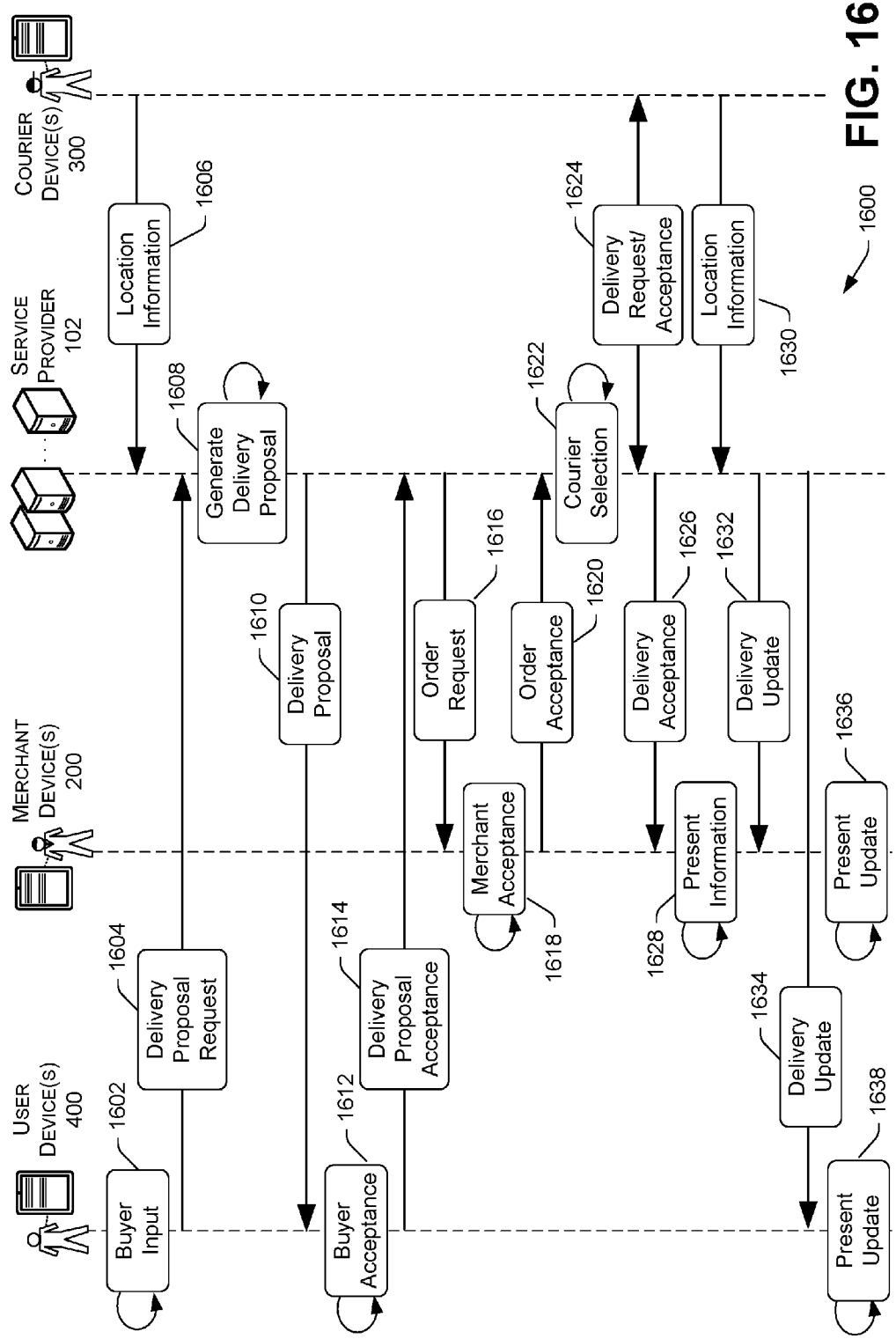

SYSTEM FOR INTEGRATING COURIER SERVICE WITH CUSTOMER APPLICATIONS

BACKGROUND

Customers often use websites and other technologies to purchase items from merchants for delivery to the customers. In some instances, a courier service may facilitate deliveries for the merchants. For example, a courier service may provide an online site that identifies items from multiple merchants that are available for delivery by the courier service. A customer may navigate to the online site, select an item from a merchant, specify an address for delivery, and purchase the item for delivery to the customer's address. The courier service may then utilize various resources to fulfill delivery of the item to the customer. For example, the courier service may cause a courier to retrieve the item from the merchant, and then delivery the item to the customer's address.

During certain time periods, however, the courier service may be unable to fulfill the delivery of items to respective customers. For example, during peak time periods, when multiple customers are purchasing items using the online site, the courier service may be unable to fulfill each of the deliveries for the customers based on the number of couriers that are available to fulfill the deliveries. This problem can arise because of a system that the courier service utilizes to receive orders, which provides customers with a standard delivery for each order that is made by a respective customer.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 16 illustrates an example sequence diagram of the techniques in the context of initiating an order at a user device.

DETAILED DESCRIPTION

Figure 1:
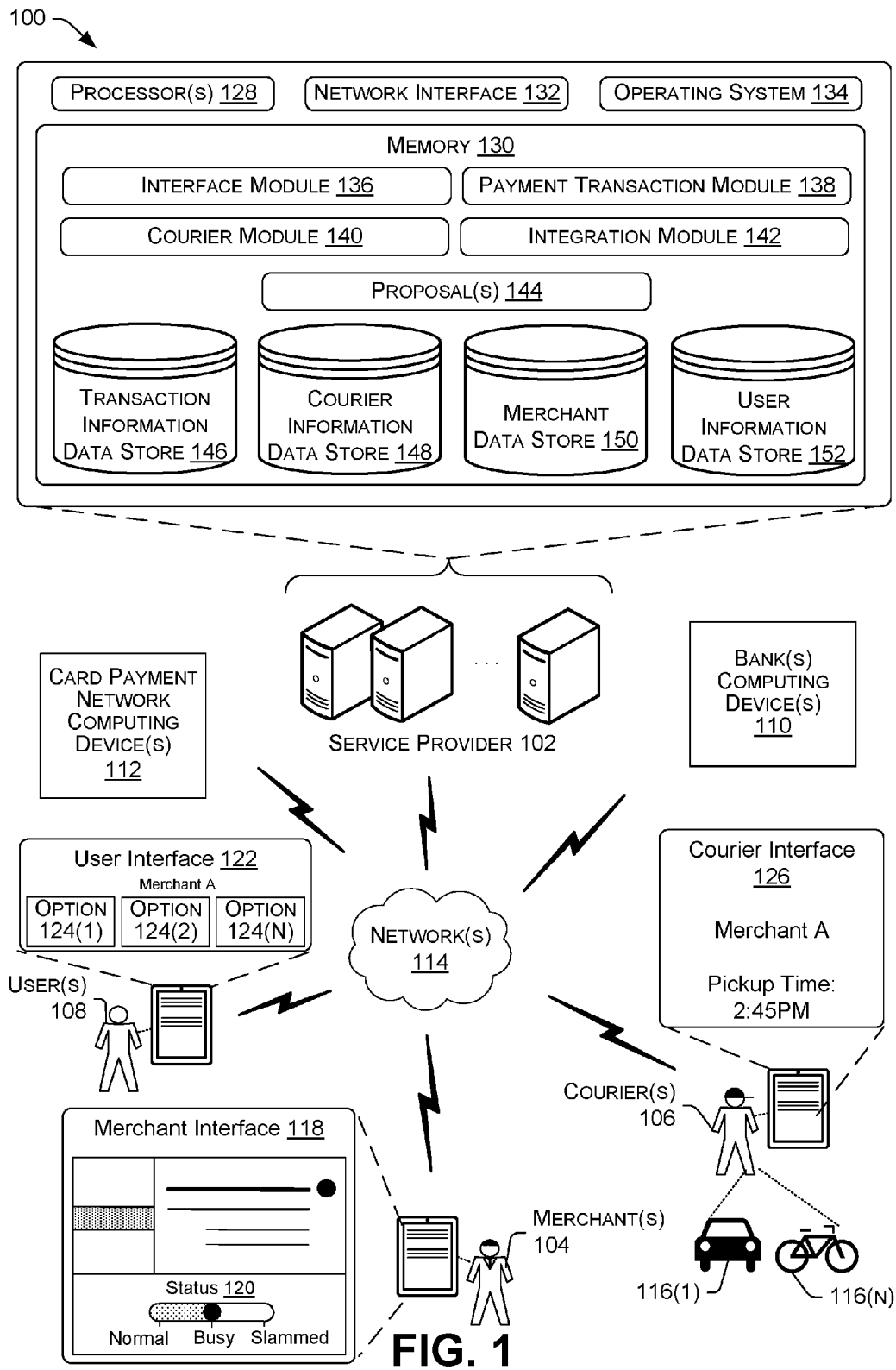
FIG. 1 illustrates an example architecture in which the techniques discussed herein may be implemented.

The technology described herein provides a system and environment for integrating a courier service with a customer application. In many instances, a service provider operates a network of courier devices to deliver items (e.g., menu items from a merchant) to customers and others. Each of the courier devices may implement a Global Positioning System (GPS) receiver or other location sensor to provide location information to the service provider. The service provider may track the locations of the courier devices to select a courier device for a delivery, send updates regarding delivery of items, or otherwise facilitate delivery of items by couriers. Additionally, or alternatively, the service provider may operate in cooperation with a plurality of merchant devices. Each of the merchant devices may implement a Global Positioning System (GPS) receiver or other location sensor to provide location information to the service provider. The service provider may use the locations of the merchant devices to facilitate delivery of items offered for acquisition by the merchants and perform other functionality.

As one example of the techniques discussed herein, a customer application may execute on a customer device associated with a customer. The customer application may provide a user interface to enable the customer to place an order for one or more items offered for acquisition by a merchant. For instance, through the user interface, the customer may select an item for acquisition. For example, the customer may place an item in an electronic shopping cart for purchase and indicate an interest in having the item delivered. The customer may then specify a location of delivery of the item and/or instructions associated with delivering the item. After selecting the item and the specifying the location, the customer may perform a checkout process in which the customer pays for the item.

The service provider may then be notified of the order and in response, the service provider may perform processing to select a courier for the delivery. For example, the service provider may track the locations of multiple courier devices over time and select a courier that satisfies one or more criteria, such as being within a particular distance to a pick-up location, being available to make a delivery, being associated with a transport vehicle that is able to transport the item, and so on. In some instances, the service provider may use a courier profile, customer profile, merchant profile, or other information to select the courier. The service provider may then send a communication to the courier requesting that the courier obtain the item from an establishment of the merchant and transport the item to the location of delivery. During delivery of the item, the service provider may receive information from the courier and/or the merchant (e.g., location information, confirmation that delivery was picked up, etc.) and determine a status of the delivery. The service provider may send the status of delivery to the customer application so that the customer may be informed of a current state of the delivery.

In some instances, such as during peak time periods when multiple customers are utilizing respective customer applications to acquire items from merchants, it may be difficult for the service provider to fulfill each of deliveries to the respective customers. For instance, the service provider may be receiving requests for the delivery of orders faster than the couriers are able to deliver respective orders to customers. In other words, there may be shortage of couriers to fulfill the number of orders that the service provider is receiving from customers.

In some instances, to continue to fulfill orders for customers, the service provider may integrate one or more fulfillment options into customer applications (e.g., user interfaces being used by respective customers to acquire items from merchants), where each option may be associated with a respective approach for fulfilling a respective order and/or a respective cost. For example, during a first period of time (e.g., when there is not a shortage of couriers to fulfill orders), the service provider may generate proposals that include multiple options for fulfilling orders. For instance, the service provider may generate a proposal for an order that includes a first option for fulfilling the order by delivery by a courier, a second option for fulfilling the order by pickup by a customer, and/or a third option for fulfilling the order by dine-in by the customer (e.g., the customer eating at the merchant's establishment). In some instances, the service provider may further determine and integrate a respective cost associated with each of the options. For instance, the first option may indicate a first cost associated with fulfilling the order by delivery, the second option may indicate a second cost associated with fulfilling the order by pickup, and/or the third option may indicate a third cost associated with fulfilling the order by dine-in. The service provider may then send the proposal to the customer application so that the customer can select a fulfillment option from the one or more fulfillment options.

For another example, during a second period of time (e.g., when there is a shortage of couriers to fulfill orders), the service provider may generate proposals that include similar fulfillment options as proposals that the service provider generates during the first period of time, or the service provider may generate proposals that include more or less fulfillment options as proposals that the service provider generates during the first period of time. For instance, the service provider may generate a proposal for an order that includes a first option for fulfilling the order by pickup by the customer and/or a second option for fulfilling the order by dine-in by the customer. Additionally, the first option may indicate a first cost associated with fulfilling the order by pickup and/or the second option may indicate a second cost associated with fulfilling the order by dine-in. However, since there may be a shortage of couriers during the second period of time, the proposal may not include an option for fulfilling the order by delivery by a courier.

Additionally, or alternatively, in some instances, the service provider may integrate incentives into the customer applications. For example, during the second period of time, the service provider may still generate proposals that include the first option for fulfilling the orders by delivery by a courier, the second option for fulfilling the orders by pickup by a customer, and/or the third option for fulfilling the orders by dine-in by the customer. However, to incentivize customers to select either the second option or the third option, in some instances, the service provider may lower costs associated with fulfilling orders by pickup and/or lower costs associated with fulfilling orders by dine-in. For instance, the service provider may provide coupons and/or other types of price reductions that can be used by customers that select the second option for fulfilling the orders by pickup and/or the third option for fulfilling the orders by dine-in. Additionally, the service provider may increase costs associated with fulfilling orders by delivery. For instance, the service provider may increase costs (e.g., a delivery charge) that the service provider charges to customers that use a courier to fulfill orders by delivery.

In some instances, the service provider may use locations of respective customers when integrating fulfillment options into the customer applications. For example, during a first period of time, such as when there is not a shortage of couriers, the service provider may identify a delivery region for a merchant. The delivery region can include an area in which customers must be located in order for the service provider to generate proposals that include the option to fulfillment by delivery. In some instances, the delivery region can include an area around the merchant. In some instances, the area can include a threshold distance around the merchant, such as a block, mile, five miles, or the like.

For another example, during a second period of time, such as when there is a shortage of couriers, the service provider may identify two or more delivery regions, and then use each of the two or more delivery regions when determining which options to integrate into proposals. For instance, the service provider may set one or more first delivery regions in which customers can be located in order for the service provider to generate proposals for the respective customers that include the options for pickup and dine-in, but not the option for delivery. The service provider can further set one or more second, different delivery regions in which customers can be located in order for the service provider to generate proposals for the respective customers that include the options for delivery, pickup, and dine-in. In some instances, the service provider may further provide incentives to customers based on the delivery regions.

In some instances, the service provider may further use a customer's history when integrating fulfillment options into the customer applications. For instance, the service provider may store transaction information that describes one or more orders between a customer and respective merchants. The transaction information for a respective order can indicate an identity of a merchant that fulfilled the order, item(s) ordered by the customer, cost(s) associated with the item(s), whether the order was fulfilled by delivery, pickup, or dine-in, and/or the like. The service provider can then use the transaction information when generating a proposal for the customer. For example, during time periods when there is a shortage of couriers, the service provider may determine that the customer has a history of fulfilling orders by pickup based on the transaction information. Based on the determination, the service provider may generate a proposal for the customer that either only includes options for pickup and dine-in, or generate a proposal that includes an incentive to fulfill the order by pickup or dine-in.

In some instances, the service provider may further use a merchant's restraints when integrating fulfillment options into the customer applications. For example, the service provider may determine that a merchant is receiving orders quicker than the merchant is capable is preparing the orders. In some instances, the service provider may make the determination based on estimated time of deliveries received by the merchant for respective orders. For instance, the estimated time of deliveries may exceed a threshold time. In some instances, the service provider may make the determination based on a number of orders that the service provider receives from customers during a given period of time. For instance, the service provider may determine that the merchant is capable of preparing thirty orders per hour, but that the service provider has received fifty orders for the merchant in the last hour. Still, in some instances, the service provider may make the determination based on an indication that the service provider receives from the merchant. For instance, the service provider may receive, from a merchant device associated with the merchant, an indication of a mode (e.g., normal, busy, and slammed) in which the merchant is currently operating.

In either instance, based on determining that the merchant is unable to fulfill orders in a timely manner (e.g., within a threshold period of time), the service provider may generate proposals for orders associated with the merchant that include options that incentivize customers to order from one or more other merchants. For example, the service provider may increase costs of orders associated with the merchant. For another example, the service provider may generate proposals that include options for ordering similar items from other merchants.

In some instances, the service provider may further use costs associated with respective orders when integrating fulfillment options into the customer applications. For example, the service provider may generate a first proposal for an order that includes options to fulfill an order by pickup and dine-in, but not by delivery, when a cost associated with the order is below a threshold cost and/or a number of items associated with the order is below a threshold number of items. In some instances, after sending the first proposal to the customer application, the service provider may receive an indication that additional items have been added to the order. For instance, a customer may add additional items to an electronic cart associated with the order using the user interface of the customer application. The service provider may then generate a second proposal for the order that includes additional options, such as the option to fulfill the order by delivery, when the cost associated with the order reaches or exceeds the threshold cost and/or the number of items associated with the order reaches or exceeds the threshold number of items. In some instances, the service provider may include an indication of the threshold cost and/or indication of the threshold number of items in the first proposal sent to the customer application.

In some instances, after sending a proposal, the service provider can receive an indication of a selection of a fulfillment option from a customer device. For instance, the customer can utilize a user interface to select an option to fulfill the order by delivery, an option to fulfill the order by pickup, and/or an option to fulfill the order by dine-in. The user device can then send the service provider an indication of the selection. For instance, the customer application executing on the user device can send the service provider a notification that indicates the selected fulfillment option. Based on receiving the indications, the service provider can then fulfill the order for the customer.

For example, based on the selection indicating a fulfillment by delivery, the service provider can identify a courier to fulfill delivery of the order and send a courier device associated with the courier instructions for delivering the item to the customer. The courier device can receive the instruction from the service provider and provide the instructions to the courier (e.g., display to the courier using a display). Additionally, the service provider can send a merchant device associated with merchant that is preparing the item information associated with the order, including an indication of when the item should be prepared and an indication of that the order will be fulfilled by the courier. The merchant device can receive the information from the service provider an in response, provide the information to the merchant (e.g., display the information for the merchant).

For a second example, based on the selection indicating fulfillment by pickup, the service provider can send the merchant device associated with the merchant information associated with the order, including an indication of when the item should be prepared and an indication of that the order will be fulfilled by the customer. The merchant device can receive the information from the service provider an in response, provide the information to the merchant (e.g., display to the merchant). In some instances, the service provider can further send the merchant device information associated with updates for the order. For instance, the information can indicate a location of the customer (e.g., customer device) and/or an estimated time of arrival for the customer. The merchant can then use the information to determine when to prepare the item.

For a third examples, based on the selection indicating fulfillment by dine-in, the service provider can again send the merchant device associated with the merchant information associated with the order, including an indication of when the item should be prepared and an indication of that the order will be fulfilled by the customer dining in at the establishment of the merchant. The merchant device can receive the information from the service provider an in response, provide the information to the merchant (e.g., display to the merchant). In some instances, the service provider can further send the merchant device information associated with updates for the order. For instance, the information can indicate a location of the customer (e.g., customer device) and/or an estimated time of arrival for the customer. The merchant can then use the information to determine when to prepare the item.

In some instances, when fulfilling orders by delivery, the service provider may continuously update which respective courier is fulfilling respective orders in order to more efficiently utilize each of the couriers. For example, the service provider may receive a first request associated with a first order made by a first customer. Based on receiving the first request, the service provider may select a first courier to fulfill the first order, and send a first courier device associated with the first courier first instructions associated with fulfilling the first order by delivery. After sending the first instructions, the service provider may receive a second request associated with a second order made by a second customer. The service provider may determine that the first courier should fulfill delivery of the second order rather than fulfill delivery of the first order. Based on the determination, the service provider may send the first courier device second instructions associated with fulfilling the second order by delivery. Additionally, the service provider may select a second courier to fulfill the first order, and send a second courier device associated with the second courier the first instructions.

The service provider may determine to update which courier is to fulfill a respective order based on one or more factors. For instance, in some examples, the service provider may determine that the first courier should fulfill the second order rather the first order based on determining that a courier location associated with the first courier device is located closer to a merchant associated with the second order than a merchant associated with the first order. In some examples, the service provider may determine that the courier location is located closer to a delivery location associated with the first order than a delivery location associated with the second order. Still, in some examples, the service provider my update which courier is to fulfill the first order based on a state of the couriers changing (e.g., from there not being a shortage of couriers to there being a shortage of couriers or from there being a shortage of couriers to there not being a shortage of couriers).

In some instances, rather than selecting a second courier to fulfill the delivery of the first order, the service provider may send the first customer one or more alternative fulfillment options for fulfilling the first order. For instance, the service provider may generate a proposal for the first order that includes a first option to fulfill the first order by pickup and a second option to fulfill the first order by dine-in. Additionally, since the service provider is no longer providing the option to fulfill the first order by delivery, the service provider may provide one or more incentives associated with the first option and/or the second option. For instance, the service provider may provide a discount for the first order based on the first customer selecting the first option and/or the second option. The service provider may then send the proposal to a customer device associated with the first customer.

In some instances, when the customer is utilizing the customer application to order items for dine-in, the customer application can provide the customer with at least three techniques for acquiring items from a merchant. A first technique can include selecting one or more items from a merchant before arriving at an establishment of the merchant. The merchant can then prepare the one or more items for the customer such that the one or more items are ready for the customer when the customer arrives at the establishment. Additionally, service provider can charge the customer for the one or more items before arriving at the establishment, during a time that the customer is at the establishment, and/or after the customer leaves the establishment.

A second technique can include allowing the customer to select one or more items while the customer is at the establishment of the merchant. For instance, the customer can arrive at the establishment. Once at the establishment, the customer can utilize the customer application to order one or more items from the merchant. The service provider can then receive one or more requests for the one or more items from the customer device and provide the one or more indications for the one or more items to the merchant device so that the merchant can prepare the one or more items for the customer. Additionally, the service provider can charge the customer for the one or more items while the customer is at the establishment and/or after the customer leaves the establishment (e.g., based on an indication that the customer is finished).

A third technique can include allowing the customer to make a reservation at the establishment of the merchant, and then charging the customer via the customer application (e.g., a card on file type transaction). For instance, the customer can utilize the customer application to create a reservation at the establishment of the merchant for a specific time. The customer can then arrive at the established at the specific time and order one or more items from the merchant. While the customer is ordering the one or more items from the merchant, the service provider can receive one or more indications of the one or more items, such as from one or more merchant devices associated with the merchant. The service provider can then charge the customer for the one or more items while the customer is at the establishment and/or after the customer leaves the establishment (e.g., based on an indication that the customer is finished).

The techniques described above discuss periods of time when there is a shortage of couriers. In some instances, the service provider can determine whether there is a shortage of couriers based on a state of the couriers. In some instances, the service provider can determine that state of the couriers based on a number of orders the service provider receives from customers, a number of potential orders the service provider may receive from customers, locations associated with respective courier devices, locations associated with the respective customers, external factors (e.g., weather, traffic conditions, road conditions, the time of day, etc.), or the like.

For a first example, the service provider may determine (1) a number of orders that are in process of being fulfilled by couriers and (2) a number of couriers that are available to fulfill the number of orders, which may be determined based on locations associated with respective couriers that can fulfill the orders (e.g., locations of respective courier devices). Based on the number or orders and the number of couriers, the service provider may determine a state of the couriers that indicates whether there are enough couriers to fulfill the number of orders in a timely manner (e.g., before items start to spoil, within a threshold period of time, etc.). For instance, the service provider may determine that ten couriers are available to fulfill orders, where each courier can deliver an average of five orders per hour. The service provider may thus determine that a state of the couriers indicates that there is not a shortage of couriers when the service provider receives fifty or less orders for delivery in a given hour, or the service provider can determine that there is a shortage of carriers when the service provider receives more than fifty orders for delivery within a given hour.

For a second example, the service provider may determine (1) a number of orders that are in process of being fulfilled by couriers, (2) a number of couriers that are available to fulfill the orders, which may be determined based on locations associated with respective couriers that can fulfill the orders (e.g., locations of respective courier devices), and (3) a number of potential orders that the service provider may receive. In some instances, the service provider determines the number of potential orders based on identifying how many customers are currently utilizing respective customer devices (e.g., respective customer applications executing on the respective customer devices) to search for merchants, search for items to acquire from the merchants, placing items within respective electronic carts, and/or the like. Based on the number or orders, the number of couriers, and the number of potential orders (and/or a percentage of the number of potential orders), the service provider may determine a state of the couriers that indicates whether there are enough couriers to fulfill both the number of orders and the number of potential orders in a timely manner (e.g., before orders start to spoil).

For instance, and using the example above, the service provider may determine that ten couriers are available to fulfill orders, where each courier can delivery an average of five orders per hour. The service provider may thus determine that a state of the couriers indicates that there is not a shortage of couriers when the total number of orders (i.e., the number of orders and the number of potential orders) that the service provider receives does not exceed fifty orders within a given hour, or that there is a shortage of carriers when the total number of orders exceeds fifty orders within a given hour.

For a third example, the service provider may determine (1) a number of orders that are in process of being fulfilled by delivery, (2) locations associated with respective couriers that can fulfill the orders (e.g., locations of respective courier devices), and (3) locations associated with respective customers (e.g., a delivery location) that made the orders. The service provider can then determine the state of the couriers based on the number of orders, the locations associated with the respective couriers, and the locations associated with the respective customers. For instance, the service provider can determine whether, based on the locations associated with the couriers and the locations associated with the customers, the couriers are able to fulfill the orders by delivery in a timely manner (e.g., before items start to spoil, within a threshold period of time, etc.). For instance, the service provider can determine that there is not a shortage of couriers when the couriers are able to deliver the orders in a timely manner, and the service provider can determine that there is a shortage of couriers when the couriers are not able to deliver the items in a timely manner.

For a fourth example, the service provider may again determine (1) a number of orders that are in process of being fulfilled by couriers and (2) a number of couriers that are available to fulfill the number of orders, similar to the first example above. However, additionally to, or alternatively from, utilizing a number of orders that a courier is capable of delivering over an average period of time (e.g., average number of deliveries per hour in the first example above), the service provider may determine the state of the couriers based on one or more threshold values. For instance, the service provider may determine that for a set number of couriers (e.g., one courier, five couriers, ten couriers, etc.), the state of the couriers indicates that there is not a shortage of couriers when the number of orders that are in process of being fulfilled (and/or the number of potential orders) does not exceed a threshold value (e.g., fifty orders, one hundred orders, etc.), and that the state of the couriers indicates that there is a shortage of couriers when the number of orders that are in process of being fulfilled (and/or the number of potential orders) exceeds the threshold value.

For instance, there may be ten couriers that are available to delivery orders to customers. Based on there being ten available couriers, the service provider may determine that a threshold value for indicating a state of the couriers equals fifty orders (e.g., five orders per courier). As such, the service provider can determine that a state of the ten couriers indicates that there is not a shortage of couriers based on the number of orders that are in process of being fulfilled by the ten couriers not exceeding fifty orders. The service provider may further determine that the state of the ten couriers above indicates that there is a shortage of couriers based on the number of orders that are in process of being fulfilled by the ten couriers exceeding fifty orders.

In some instances, the service provider may utilize one or more levels to describe the shortage of couriers. For instance, the service provider may determine that the shortage is at a first level when the service provider is short a first number of couriers (and/or first range of couriers), a second level when the service provider is short a second number of couriers (and/or second range of couriers), a third level when the service provider is short a third number of couriers (and/or third range of couriers), and the like.

For example, and using the first example above where there are ten available couriers to fulfill orders, where each courier is capable of fulfilling an average of five deliveries per hour, the service provider can determine that there is a shortage of one courier when the service provider receives between fifty-one and fifty-five orders in a given hour. Based on the determination, the service provider may determine that the shortage of couriers is at level one. For another example, and again using the first example above where there are ten available couriers to fulfill orders, where each courier is capable of fulfilling an average of five deliveries per hour, the service provider can determine that there is a shortage of two couriers when the service provider receives between fifty-six and sixty orders in a given hour. Based on that determination, the service provider can determine that the shortage of couriers is at level two.

In some instances, the service provider may utilize the levels when integrating fulfillment options into customer applications. For example, the service provider may not provide options to fulfill orders by delivery for customers when the shortage of couriers is at a specific level (e.g., one, two, etc.) or greater. For another example, the service provider may not provide options to fulfill orders by delivery for customers that are within a first delivery region associated with a respective merchant when the shortage of couriers is at level one, and may not provide options to fulfill orders by delivery for customers that are within a second delivery region associated with the respective merchant when the shortage of couriers is at level two.

Additionally or alternatively, in some instances, the service provider may utilize the levels when integrating incentives into the customer applications. For example, the service provider may provide a first incentive for fulfilling orders by pickup or dine-in when the shortage of couriers is at level one, and provide a second, greater incentive for fulfilling orders by pickup or dine-in in when the shortage of couriers is at level two. For another example, the service provider may increase a cost (e.g., delivery charge) associated with fulfilling orders by delivery by a first amount when the shortage of couriers is at level one, and increase the cost associated with fulfilling orders by delivery by a second, greater amount when the shortage of couriers is at level two.

It should further be noted that the techniques above describe integrating fulfillment options and/or incentives into customer applications by generating and sending proposals to the customer applications. Additionally to, or alternatively from, generating and sending proposals, the service providers may integrate the fulfillment options and/or the incentives into the customer applications by sending the customer applications data that describes when the customer applications should provide the fulfillment options and/or the incentives. For instance, the data may describe one or more locations in which customer devices can be located in order for respective customer applications executing on the customer applications to provide the fulfillment options for delivery, pickup, and/or dine-in. Additionally, the data may describe one or more locations in which customer devices can be located in order for the respective customer applications to provide the incentives to the customers. In addition to one or more locations, the data can describe a threshold number of items and/or a threshold cost that orders that must be associated with in order for the respective customer applications to provide one or more fulfillment options and/or one or more incentives.

In some instances, the service provider generates the data using the techniques described above. For instance, the service provider can generate the data based on the state of the couriers, the state of the merchants (e.g., merchant restraints), or the like. In some instances, the service provider updates and sends the data at given time intervals, such as every second, minute, hour, or the like. In some instances, the service provider updates and send the data whenever there is a change to the state of the couriers and/or a change to the state of the merchants.

By performing the techniques described above, the service provider is capable of integrating fulfillment options into customer applications that are being utilized by respective customers on respective customer devices to acquire items from merchants. In other words, the service provider improves previous systems used by courier services to delivery items, which merely provide a standard delivery for each order that is received from a respective customer device. Additionally, by integrating fulfillment options and/or fulfillment costs into respective customer applications, the service provider described above provides improvements over previous systems by synchronizing data received from merchant devices, courier devices, and user devices when generating proposals for respective orders.

FIG. 1 illustrates an example architecture 100 in which the techniques discussed herein may be implemented. The architecture 100 includes a service provider 102 that communicates with one or more merchant(s) 104, one or more courier(s) 106, one or more user(s) 108 (e.g., customers, buyers, etc.), one or more bank computing devices 110, and/or one or more card payment network computing devices 112 to perform a variety of processing. As one example, the service provider 102 may manage, for the merchant(s) 104, a preparation time and/or delivery time that is exposed to the user(s) 108, the courier(s) 106, and/or others. Further, in some instances the service provider 102 may facilitate transactions between merchant(s) 104 and user(s) 108, which may include communicating with the one or more bank computing devices 110 and/or the one or more card payment network computing devices 112. Each of the merchant(s) 104, the courier(s) 106, and/or the user(s) 108 may be associated with a computing device. As illustrated, any of the computing devices of the architecture 100 may communicate with each other via one or more networks 114. The courier(s) 106 may each employ one or more of a plurality of vehicles 116(1)-116(n), such as automobiles, bicycles, scooters, motorcycles, buses, airplanes, helicopters, boats, skateboards, etc. Although in other instances the courier(s) 106 may travel by foot or otherwise without a vehicle.

A merchant 104 may include any business engaged in the offering of goods or services for acquisition by user(s) 108 (e.g., customer, buyers, etc.) in exchange for compensation received from user(s) 108. Actions attributed to a merchant 104 may include actions performed by employees or other agents of the merchant 104 and, thus, no distinction is made herein between merchants 104 and their employees unless specifically discussed. Meanwhile, a user 108 may include any entity that acquires goods or services from a merchant 104, such as by purchasing, renting, leasing, borrowing, licensing or the like. Hereinafter, goods and/or services may be referred to as items. An item may include a finished product, partially finished product, raw material, and so on. Thus, a merchant 104 and a user 108 may interact with each other to conduct a transaction in which the user 108 acquires one or more items from a merchant 104, and in return, the user 108 provides payment to the merchant 104.

A courier 106 may include any entity engaged in delivering an item. In one example, a courier 106 may transport an item from a merchant 104 to a user 108 (e.g., upon purchase of the item by the user 108 from the merchant 104). In another example, a courier 106 may transport an item from a supplier to a merchant 104. In yet another example, a courier 106 may transport an item between merchants 104. Some examples discussed herein enable people to participate as couriers 106 in a type of crowdsourced service economy. Here, essentially any person with a mobile device is able to immediately become a courier 106, or cease to be a courier 106, in a courier network that provides delivery services for delivery of items. For example, a user 108 or a merchant 104 may become a courier 106.

The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

As noted above, the service provider 102 may perform a variety of processing. As illustrated in FIG. 1, the service provider 102 may facilitate a merchant interface 118 to enable merchants to fulfill orders, manage inventory, control preparation times, view courier information, and so on. For example, the merchant interface 118 may indicate orders that are placed with the merchant 104 (including items in those orders), where the orders are in the process of being prepared or delivered, courier(s) 106 and/or user(s) 108 to retrieve the items, times for courier(s) 106 and/or user(s) 108 to pickup the items for dine-in or delivery, locations of courier(s) 106 and/or user(s) 108, how busy the merchant 104 is, and so on. In some instances, the merchant interface 118 of FIG. 1 includes a status bar 120 for the merchant 104 to enable or disable modes associated with preparation times for items. For example, the merchant 104 may interact with the status bar 120 to select a busy mode associated with a threshold amount of preparation activity. In response, the service provider 102 may transition the merchant to the busy mode and update a preparation time associated with the merchant 104. Although three modes are illustrated in FIG. 1 (normal, busy, and slammed), any number of modes may be used.

The service provider 102 may also facilitate a user interface 122 to enable a user 108 to purchase items, manage purchases of items, monitor deliveries, and so on. For example, the user interface 122 may display a catalog of items that are offered for acquisition by one or more merchants (merchant A in this example). The user interface 122 may also display other information to enable the user 108 to place an order for an item (e.g., electronic carts, checkout screens, etc.). The user interface 122 may additionally, or alternatively, enable a user to track an order that is being delivered to the user 108.

As illustrated in FIG. 1, the user interface 122 may further provide the user 108 with one or more option(s) 124(1)-124(N) for fulfilling an order. In some instances, each option 124(1)-124(N) may be associated with a respective approach for fulfilling a respective order. In some instances, each option 124(1)-124(N) may further be associated with a respective cost associated with the respective approach. For instance, a first option 124(1) may be associated with fulfilling the order by delivery by a courier 106, a second option 124(2) may be associated with fulfilling the order by pickup by the user 108, and a third option 124(N) may be associated with fulfilling the order by dine-in by the user 108. Additionally, the first option 124(1) may indicate a first cost associated with fulfilling the order by pickup, the second option 124(2) may indicate a second cost associated with fulfilling the order by delivery, and the third option 124(N) may indicate a third cost associated with fulfilling the order by dine-in.

The service provider 102 may also facilitate a courier interface 126 to enable courier(s) 106 to delivery items to user(s) 108. The courier interface 126 may provide information regarding requests to deliver orders, orders that are assigned to a courier 106, details regarding an order (e.g., items ordered, price of order, etc.), merchant information (e.g., pickup location, merchant's telephone number, etc.), buyer information (e.g., delivery location, buyer's telephone number, etc.), user service information (e.g., a telephone number of a customer service agent associated with the service provider 102 that may handle issues with an order), and so on. As shown, the courier interface 126 may display a delivery associated with Merchant A (e.g., one of the merchant(s) 104), which includes a pickup time for the order.

The service provider 102 may also communicate with the one or more card payment network computing devices 112 to conduct a transaction electronically. The one or more card payment network computing devices 112 may be associated with a card payment network (e.g., MasterCard®, VISA®, etc.). The service provider 102 may also communicate with the one or more bank computing devices 110 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, a user 108 may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

As noted above, one or more computing devices of the architecture 100 may communicate via the one or more networks 114. The one or more networks 114 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 114 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the architecture 100 may communicatively couple to the one or more networks 114 in any manner, such as by a wired or wireless connection.

As noted above, the service provider 102 may be implemented as one or more computing devices (e.g., one or more service computing devices). The one or more computing devices may include one or more processor(s) 128, memory 130, one or more communication network interface(s) 132, and an operating system 134. The one or more processor(s) 128 may include a central processing unit (CPU), a graphics processing unit (GPU), a microprocessor, a digital signal processor, and so on.

The one or more communication network interfaces 132, along with any other communication network interface(s) 132 described herein, may include one or more interfaces and hardware components for enabling communication with various other devices over the network 114 or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The memory 130 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

The memory 130 (as well as all other memory described herein, including memory of a merchant device, a courier device, a user device, and so on) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

As illustrated, the memory 130 includes an interface module 136, a payment transaction module 138, a courier module 140, and an integration module 142. The memory further includes proposal(s) 144, a transaction information data store 146, a courier information data store 148, a merchant data store 150, and a user information data store 152.

The interface module 136 may facilitate various interfaces for user(s) 108, merchant(s) 104, and/or courier(s) 106. In particular, the interface module 136 may operate in cooperation with the payment transaction module 138, courier module 140, and/or the integration module 142 to provide a merchant interface(s) (e.g., merchant interface 118), user interface(s) (e.g., user interface 122), and/or courier interface(s) (e.g., courier interface 126). For example, the interface module 136 may operate to receive information regarding preparation times, pickup times, and/or delivery times from merchant(s) 104 via merchant interface(s), and provide such information via user interface(s), and/or courier interface(s). Further, the interface module 136 may communicate with user interface(s) to receive requests for cost of deliveries of items, estimated amounts of delivery times for respective items, or the like, and provide proposals 144 back to user interface(s).

The payment transaction module 138 may facilitate transactions between merchant(s) 104, user(s) 108, and/or courier(s) 106. For instance, during transaction, the payment transaction module 138 may be configured to enable electronic payments for the transactions. In some instances, the service provider 102 may include one or more computing devices that are configured to perform secure electronic financial transactions between merchant(s) 104 and user(s) 108 through, for example, data communicated between a user device and a merchant device. When paying for a transaction, a user 108 can provide the amount of payment that is due to a merchant 104 using cash, check, a payment card, NFC, by electronic payment, and/or the like. The merchant 104 (or courier 106) may interact with a device to process the transaction at a point of sale (POS) (e.g., the place where the user 108 meets with the merchant 104 or courier 106). Further, the transaction may be processed by electronically transferring funds from a financial account associated with a user account for the user 108 to a financial account associated with a merchant account for the merchant 104. During the transaction, the merchant device can determine and send data describing the transaction, including, for example, appointment data, services related to and/or provided, item(s) being purchased, the amount of the item(s), user information, and so forth.

The payment transaction module 138 may store transaction records in a transaction information data store 146. A transaction record may include information regarding a time, place and/or an amount of a transaction (e.g., order), information related to the item acquired (e.g., information identifying the item sold), a type of payment being used (e.g., cash, check, payment card, electronic payment, etc.), as well as additional information, such as user information and whether the order was fulfilled by delivery, pickup, and/or dine-in. For instance, if a payment card is used, a transaction record can include data stored in the payment card (e.g., Track 1 data (cardholder name, card number and other card information)). In addition, when completing the transaction, a user 108 may sometimes provide a receipt email address for receiving a receipt through email. Other examples of data that can be captured for a transaction record include item information (e.g., an itemized listing of the items being acquired, the price being paid for each item, descriptors of the items (size, flavor, color, etc.), geolocation data indicating a geographic POS location of a particular transaction, online/offline card data, data describing a merchant 104 (e.g., a merchant identifier, a merchant category code (MCC), etc.), data identifying a courier 106 delivering an item, any type of data that is received upon a user's authentication into a social network, if any, and various other types of information.

In some implementations, the payment transaction module 138 enables card-less payments (e.g., electronic payments) for transactions between user(s) 108, merchant(s) 104, and/or courier(s) 106 based on interaction of user(s) 108 with respective user devices and interaction of the merchant(s) 104/courier(s) 106 with respective devices. Accordingly, in some examples a card-less payment transaction may include a transaction conducted at a POS location during which an electronic payment account of a user 108 is charged without the user 108 having to physically present a payment card to the merchant/courier at the POS location. Consequently, a merchant 104/courier 106 need not receive any details about the financial account of the user 108 for the transaction to be processed. As one example, the electronic payment may be charged to a credit card issuer or credit card number that the user provided when signing up with the service provider 102 for an electronic payment account. As another example, the user 108 may have a quantity of money pre-paid in an account maintained for use in making the electronic payments. Other variations will also be apparent to those of skill in the art having the benefit of the disclosure herein.

The courier module 140 may manage courier(s) 106. For example, the courier module 140 may track locations of courier(s) 106 (before, during, and/or after delivery), select a courier 106 for delivery, communicate with the courier 106 to facilitate the delivery, provide updates regarding a status of delivery, predict courier travel times to various delivery locations for various times of the day and/or days of the week, and so on. To do so, the courier module 140 may analyze various information, such as information included in a request for a delivery proposal 144, information included in a request for a delivery status update, information about a courier stored in the courier information data store 148 or elsewhere (e.g., an identity of the courier 106, a current location of the courier 106, courier profile information, etc.), information about a merchant 104 stored in the merchant data store 150 or elsewhere (e.g., an identity of the merchant 104, a current location of the merchant 104, merchant profile information, item(s) provided by the merchant 104, etc.), information about a user 108 stored in the user information data store 152 (e.g., an identity of the user 108, a current location of a user 108, history of orders associated with the user 108, fulfillment preferences of the user 108 (delivery, pickup, dining in), a user profile, etc.), and so on. In some instances, the courier module 140 may manage courier(s) 106 through activation, movement, positioning, and/or deactivation.

In some instances, the courier module 140 may track locations of user(s) 108 when user(s) 108 act as couriers managed by the service provider 102. To illustrate, the courier module 140 may track locations of the user(s) 108 before, during, and/or after a pickup of an order, and/or before, during and/or after dining in at a merchant's establishment, based on location information received from associated devices (e.g., mobile devices) of the user(s) 108. For instance, user 108 may use a respective device to request an order from a merchant 104. Based on the receiving the request, the courier module 140 may track the location of the user 108 between a time the request is received and a time that the user 108 picks the order up at the merchant 104. In some instances, the courier module 140 may further send updates to the merchant 104 (e.g., via the merchant interface 118) indicating the location of the user, 108, an estimated time-of-arrival of the user 108, and/or the like.

In some instances, in order to treat the user(s) 108 as part of the courier system, the applications executing on the respective devices of the user(s) 108 may include at least a portion the same computer-executable code as the applications executing on the respective devices of the courier(s) 106. As such, the applications executing on the respective devices of the user(s) 108 may provide the user(s) 108 with the same functionality as the applications executing on the respective devices of the courier(s) 106.

The integration module 142 may function to integrate one or more fulfillment options into applications, where each option may be associated with a respective approach for fulfilling a respective order and/or a respective cost. For example, during a first period of time, such as when there is not a shortage of courier(s) 106 to fulfill orders, the integration module 142 may generate proposal(s) 144 that include multiple options for fulfilling orders. For instance, the integration module 142 may generate a proposal 144 for an order that includes a first option for fulfilling the order by pickup by a user 108, a second option for fulfilling the order by delivery by a courier 106, and a third option for fulfilling the order by dine-in by the user 108 (e.g., the user 108 eating at the merchant's 104 establishment). In some instances, the integration module 142 may further determine and integrate a respective cost associated with each of the options. For instance, the first option may indicate a first cost associated with fulfilling the order by pickup, the second option may indicate a second cost associated with fulfilling the order by delivery, and the third option may indicate a third cost associated with fulfilling the order by dine-in.

For another example, during a second period of time, such as when there is a shortage of courier(s) 106 to fulfill orders, the integration module 142 may generate proposal(s) 144 that include greater or fewer options for fulfilling orders. For instance, the integration module 142 may generate a proposal 144 for an order that includes a first option for fulfilling the order by pickup by a user 108 and a second option for fulfilling the order by dine-in in by the user 108. Additionally, the first option may indicate a first cost associated with fulfilling the order by pickup, and the second option may indicate a second cost associated with fulfilling the order by dining in. However, since there may be a shortage of courier(s) 106 during the second period of time, the proposal 144 may not include an option for fulfilling the order by delivery by a courier 106.

Additionally, or alternatively, in some instances, the integration module 142 may function to integrate incentives into the applications so that the user(s) 108 will be more inclined to select one or more options. For example, during the second period of time, the integration module 142 may still generate proposal(s) 144 that include the first option for fulfilling the orders by pickup by a user(s) 108, the second option for fulfilling the orders by delivery by a courier 106, and the third option for fulfilling the orders by dine-in in by the user(s) 108. However, to incentivize the user(s) 108 to select either the first option or the third option, in some instances, the integration module 142 may lower costs associated with fulfilling orders by pickup and/or lower costs associated with fulfilling orders by dine-in For instance, the integration module 142 may provide coupons and/or other types of price reducing incentives that can be used if the user(s) 108 that select first option for fulfilling the orders by pickup and/or the third option for fulfilling the orders by dine-in. Additionally, or alternatively, the integration module 142 may increase costs associated with fulfilling orders by delivery. For instance, the integration module 142 may increase costs (e.g., delivery charges) that the service provider 102 charges to user(s) 108 that use a courier to fulfill orders by delivery.

In some instances, the integration module 142 may use locations of respective user(s) 108 when integrating fulfillment options into the applications. For example, during time periods when there is not a shortage of courier(s) 106, the service provider 102 may identify a delivery region for a merchant 104. The delivery region can include an area in which user(s) 108 must be located in order for the service provider 102 to generate proposals 144 that include the option to fulfill the respective orders by delivery. In some instances, the delivery region can include an area around the merchant 104. In some instances, the area can include a threshold distance around the merchant 104, such as a block, mile, five miles, or the like.

For another example, during time periods where there is a shortage of courier(s) 106, the service provider 102 may identify two or more delivery regions, and then use each of the two or more delivery regions when determining which options to include in proposal(s) 144. For instance, the service provider 102 may set one or more first delivery regions in which user(s) 108 can be located in order for the service provider 102 to generate proposals 144 for the respective user(s) 108 that include the options for pickup and dine-in, but not the option for delivery. The service provider 102 can further set one or more second, different delivery regions in which user(s) 108 can be located in order for the service provider 102 to generate proposals 144 for the respective user(s) 108 that include the options for pickup, delivery, and dine-in. In some instances, the service provider 102 may further provide incentives to user(s) 108 based on the delivery regions. For instance, the service provider 102 may provide first incentives to user(s) 108 that are located within the one or more first delivery regions, and the service provider 102 may provider second incentives to user(s) 108 that are located with the one or more second delivery regions.

In some instances, the integration module 142 may further use a user's 108 history when integrating fulfillment options into the applications. For instance, the transaction data store 146 and/or the user information data store 152 may store transaction information that describes one or more orders between a user 108 and respective merchants 104. The transaction history for a respective order can indicate an identity of a merchant 104 that fulfilled the order, item(s) ordered by the user 108 during the respective order, cost(s) associated with the item(s), whether the order was fulfilled by pickup, delivery, or dining in, or the like. The integration module 142 can use the transaction information to determine a fulfillment preference for the user 108, such that the user 108 prefers delivery, pickup, and/or dine-in. The integration module 142 can then use the preference when determining which options to integrate into a applications for the user 108.

For example, during time periods when there is a shortage of courier(s) 106, the service provider may determine that the user 108 has a history of fulfilling orders by pickup based on the transaction history and as such, that the user 108 prefers to fulfill orders by pickup. Based on the determination, the integration module 142 may generate a proposal 144 for the user 108 that either only includes options for pickup and dining in, or the integration module 142 may generate a proposal 144 for the user 108 that includes an incentive to fulfill the order by pickup or dining in.

In some instances, the integration module 142 may further use a merchant's 104 restraints when integrating fulfillment options into the applications. For example, the service provider 102 may determine that a merchant 104 is receiving orders quicker than the merchant 104 is capable is preparing the orders. In some instances, the service provider 102 may make the determination based on estimated time of deliveries received by the merchant 104 for respective orders. For instance, the estimated time of deliveries may exceed a threshold time. In some instances, the service provider 102 may make the determination based on a number of orders that the service provider 102 receives from user(s) 108 during a given period of time. For instance, the service provider 102 may determine that the merchant 104 is capable of preparing thirty orders per hour, but that the service provider 102 has received fifty orders for the merchant 104 in the last hour. Still, in other instances, the service provider 102 may make the determination based on the merchant 104 using the status bar 120 (and/or some other type of indicator) to indicate the mode in which the merchant 104 is currently operating. For instance, the merchant 104 may utilize the status bar 120 on the merchant interface 118 to indicate that the merchant 104 is operating in a normal, busy, or slammed mode.

In either instance, based on determining that the merchant 104 is unable to fulfill orders in a timely manner, the integration module 142 may generate proposal(s) 144 for orders associated with the merchant 104 that include options that incentivize user(s) 108 to order from one or more other merchant(s) 104. For instance, the integration module 142 may generate proposal(s) 144 for orders associated with the merchant 104 that include increased costs for fulfilling order by one or more of pickup, delivery, and dining in. Additionally, or alternatively, the integration module 142 may generate proposal(s) for orders associated with the merchant 104 that include options for ordering similar items from the one or more other merchant(s) 104.

In some instances, the integration module 142 may further use costs associated with respective orders when integrating fulfillment options into applications. For example, the integration module 142 may generate a proposal 144 for an order that includes options to fulfill the order by pickup and dining in, but not by delivery, when a cost of the order is below a threshold cost and/or a number of items included in the order is below a threshold number of items. In some instances, after sending the proposal 144 to the application, the service provider 102 may receive an indication that additional items have been added to the order. For instance, a user 108 may add additional items to an electronic cart associated with the order using the user interface 122. The integration module 142 may then generate a new proposal 144 for the order that includes additional options, such as the option to fulfill the order by delivery, when the cost of the order reaches and/or exceeds the threshold cost and/or the number of items included in the order reaches and/or exceeds the threshold number of items. In some instances, the integration module 142 may include an indication of the threshold cost and/or indication of the threshold number of items in the first proposal sent to the user 108.

In some instances, the integration module 142 may utilize one or more levels when integrating fulfillment options into applications. For instance, as discussed above, when there is a shortage of courier(s) 106, the service provider 102 may determine a level that indicates how many courier(s) 106 the service provider 102 is short for fulfilling orders that are currently in the process of being delivered to user(s) 108. For instance, the service provider 102 may determine that the shortage is at a first level when the service provider 102 is short a first number of courier(s) 106 to fulfill the orders, a second level when the service provider 102 is short a second number of courier(s) 106 to fulfill the orders, a third level when the service provider 102 is short a third number of courier(s) 106 to fulfill the orders, and the like.

Using the one or more levels, the integration module 142 can determine which options to integrate into applications. For example, the integration module 142 may generate proposal(s) 144 that do not include the option to fulfill respective orders by delivery by a courier 106 when the shortage of courier(s) 106 is a specific level (e.g., one, two, etc.) or greater. For another example, the integration module 142 may generate proposal(s) 144 that do not include the option to fulfill respective orders by delivery by a courier 106 when respective user(s) 108 associated with the respective orders are located in a first delivery region associated with the respective merchant(s) 104 and the shortage of courier(s) 106 is at level one. Additionally, the service provider 102 may generate proposal(s) 144 that do not include the option to fulfill respective orders by delivery by a courier 106 when respective user(s) 108 associated with the respective orders are located within a second delivery region associated with the respective merchant(s) 104 and the shortage of courier(s) 106 is at level two.

Additionally or alternatively, in some instances, the integration module 142 may utilize the levels when integrating incentives into applications. For example, the integration module 142 may generate proposal(s) 144 that include a first incentive for fulfilling orders by pickup or dine-in when the shortage of courier(s) 106 is at level one, and generate proposal(s) 144 that include a second, greater incentive for fulfilling orders by pickup or dine-in when the shortage of courier(s) 106 is at level two. For another example, the integration module 142 may generate proposal(s) 144 that include an increased a cost (e.g., delivery charge) associated with fulfilling orders by delivery by a first amount when the shortage of courier(s) 106 is at level one, and generate proposal(s) 144 that include an increased the cost associated with fulfilling orders by delivery by a second, greater amount when the shortage of courier(s) 106 is at level two.

While FIG. 1 illustrates components and data of the service provider 102 as being present in a single location, these components and data may alternatively be distributed across different computing devices and/or different locations in any manner. Consequently, the functions may be implemented by one or more computing devices, with the various functionality described being distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

Figure 2:
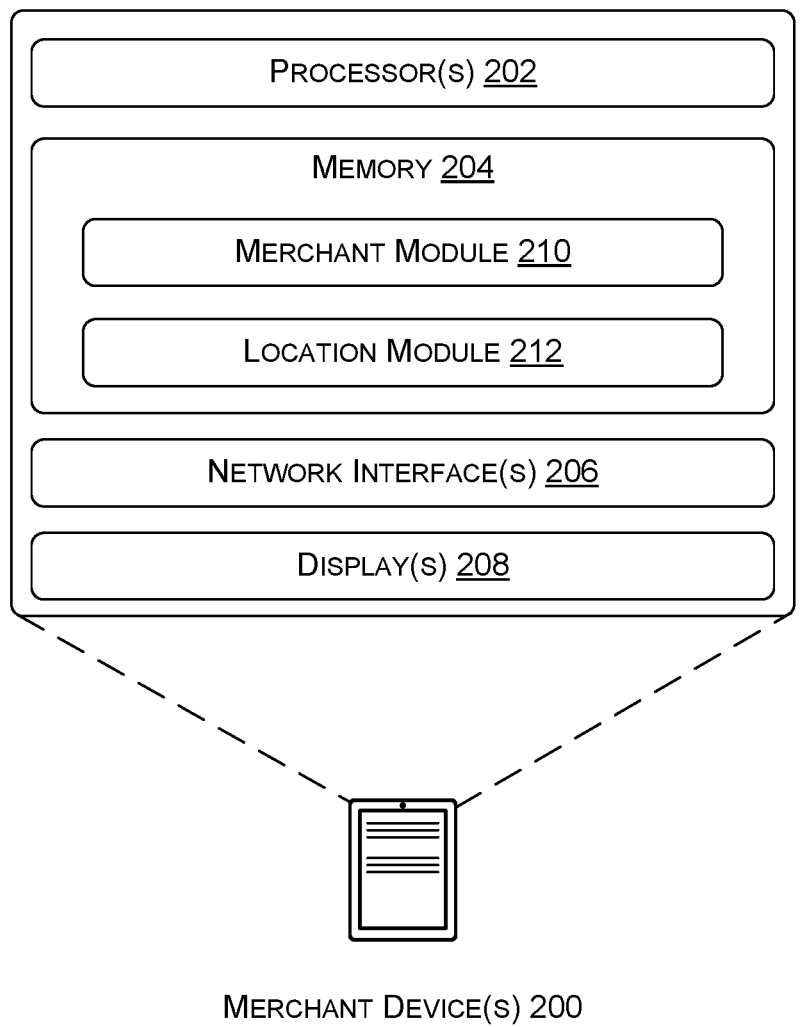
FIG. 2 illustrates example details of a merchant device.

FIG. 2 illustrates example details of a merchant device 200. The merchant device 200 may be employed by the merchant 104 of FIG. 1. The merchant device 200 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., navigation system), an appliance, a camera, a robot, a hologram system, a security system, a home-based computer system (e.g., intercom system, home media system, etc.), a projector, an automated teller machine (ATM), and so on. In some instances, the merchant device 200 may be a mobile device.

The merchant device 200 may include one or more processors 202, memory 204, one or more communication network interface(s) 206, and one or more display(s) 208. The one or more processors 202 may include a central processing unit (CPU), a graphics processing unit (GPU), a microprocessor, a digital signal processor, and so on. The one or more display(s) 208 may include a touch screen, a Liquid-crystal Display (LCD), a Light-emitting Diode (LED) display, an organic LED display, a plasma display, an electronic paper display, or any other type of technology. Although not illustrated, the merchant device 200 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The merchant device 200 may additionally include, or be associated with, input device(s) such as a keyboard, a mouse, a pen, a voice input device, a touch input device, etc. The memory 204 may include a merchant module 210 and a location module 212.

The merchant module 210 (e.g., merchant application) may perform various processes to assist a merchant in processing transactions with users, controlling preparation times, managing inventory, communicating with couriers, and so on. The merchant module 210 may provide various interfaces and/or dashboards (e.g., a merchant interface). In one example, the merchant module 210 may facilitate transactions with users by accepting payment from users (e.g., via a card reader, NFC connection to a user device, Bluetooth® connection to the user device, etc.), providing receipts for items (including printing receipts), receiving input from users for items being acquired by the users (e.g., confirmation, signature for credit card, etc.), and so on. In another example, the merchant module 210 may provide information regarding items that are ordered for delivery, such as item order details (e.g., a list of items ordered, price, etc.), a delivery time, a courier to deliver order, and so on. In a further example, the merchant module 210 may enable a merchant to manage inventory by informing the merchant of inventory levels (e.g., number of items currently in-stock), order additional inventory, view notifications from the service provider 102 regarding inventory, offer inventory for acquisition to others, seek financing for inventory, and so on. In yet another example, the merchant module 210 may enable a merchant to set a preparation time for items (e.g., set the merchant to a mode associated with preparing items). In some instances, an interface may be provided to a user to facilitate a transaction (e.g., an interface to confirm payment, provide a signature, etc.), manage inventory, view analytics data, and so on. The merchant module 210 may communicate with the service provider 102 to facilitate a variety of functionality (e.g., any components of the service provider 102).

The location module 212 may determine a location of the merchant device 200. In some instances, the location is provided to the service provider 102, or used locally, to facilitate various functions, such as processing of transactions when a user located within a particular proximity to the merchant device 200. The location module 212 may determine a geographic location of the merchant device 200 from geolocation techniques (e.g., satellite-based systems—global positioning system (GPS)), cell tower location data, wireless access point location data, wireless beacon location, and so forth. As such, the location module 212 may utilize data from a location sensor of the merchant device 200, such as a GPS receiver or communication interface that can determine (e.g., from cell towers or wireless access points) a geographic location of the merchant device 200.

In some types of businesses, the merchant device 200 may be associated with a store or other place of business of a merchant, and thus, may be a fixed location that typically does not change on a day-to-day basis. In other types of businesses, however, the merchant device 200 may move locations from time to time, such as in the case where the merchant operates a food truck, is a street vendor, a cab driver, etc. or has an otherwise mobile business (e.g., in the case of merchants who sell items at buyer's homes, places of business and so forth).

Figure 3:
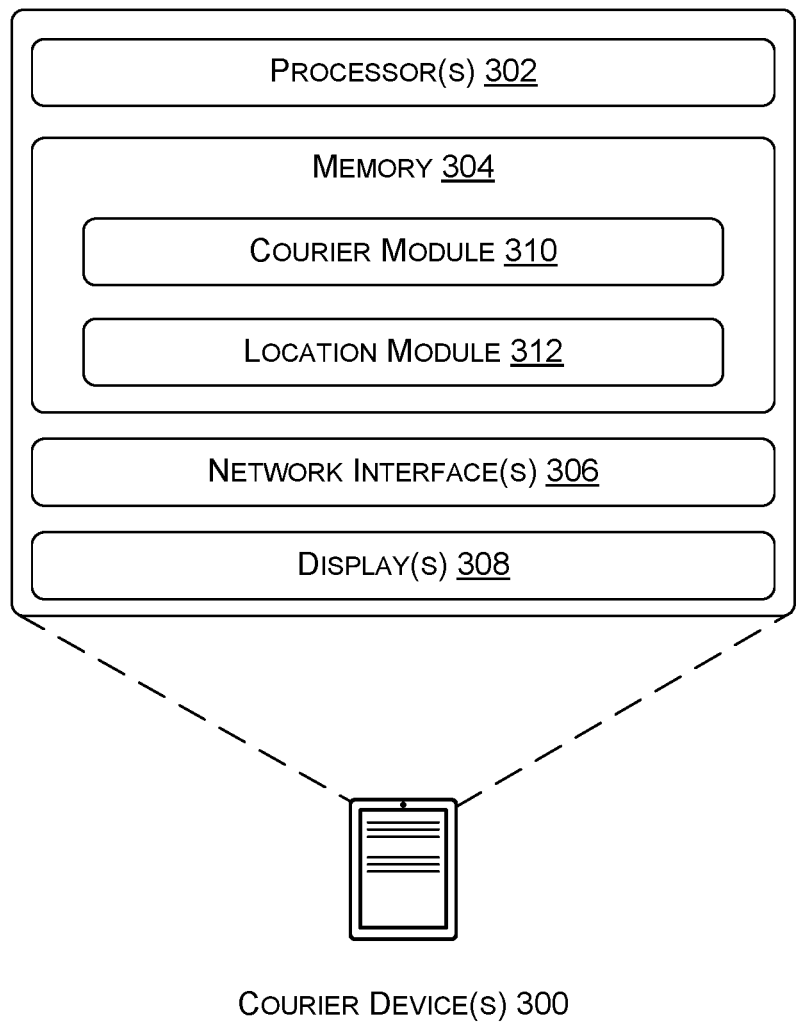
FIG. 3 illustrates example details of a courier device.

FIG. 3 illustrates example details of a courier device 300. The courier device 300 may be employed by the courier 106 of FIG. 1. The courier device 300 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., a navigation system), an appliance, a camera, a robot, a hologram system, a security system, a home-based computer system (e.g., intercom system, home media system, etc.), a projector, an automated teller machine (ATM), and so on. In some instances, the courier device 300 may be a mobile device.

The courier device 300 may include one or more processor(s) 302, memory 304, one or more communication network interface(s) 306, and one or more display(s) 308. The one or more processor(s) 302 may include a central processing unit (CPU), a graphics processing unit (GPU), a microprocessor, a digital signal processor, and so on. The one or more display(s) 308 may include a touch screen, a Liquid-crystal Display (LCD), a Light-emitting Diode (LED) display, an organic LED display, a plasma display, an electronic paper display, or any other type of technology. Although not illustrated, the courier device 300 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The courier device 300 may additionally include, or be associated with, input device(s) such as a keyboard, a mouse, a pen, a voice input device, a touch input device, etc. The memory 304 may include a courier module 310 and a location module 312.

The courier module 310 (e.g., courier application) may receive order information from the service provider 102 to provide a courier with information for picking up an order from a merchant's pickup location and/or for delivering the order to user's delivery location. The courier module 310 may further enable the courier to respond to the service provider 102 to confirm acceptance of a delivery job. In some instances, the courier module 310 may receive updated delivery information (e.g., pickup time, drop off time, etc.) after an order has been accepted. The updated delivery information may be due to a merchant transitioning from one mode to another mode, causing a preparation time to be updated. The courier module 310 may provide various interfaces and/or dashboards (e.g., a courier interface).

In some cases, the courier module 310 may facilitate the courier to become active or inactive (e.g., in cases where users are used as couriers). For example, the courier module 310 may be periodically pinged by the service provider 102 to determine interest in becoming active and, if so, requesting current location information of the associated courier. A courier who is interested in being activated may respond with location information, while a courier who is not interested in being activated may keep location information private by not responding.

The location module 312 may determine a location of the courier device 300. In some instances, the location is provided to the service provider 102, or used locally, to facilitate various functions. The location module 312 may determine a geographic location of the courier device 300 from geolocation techniques (e.g., satellite-based systems—global positioning system (GPS)), cell tower location data, wireless access point location data, wireless beacon location, and so forth. As such, the location module 312 may utilize data from a location sensor of the courier device 300, such as a GPS receiver or communication interface that can determine (e.g., from cell towers or wireless access points) a geographic location of the courier device 300.

Figure 4:
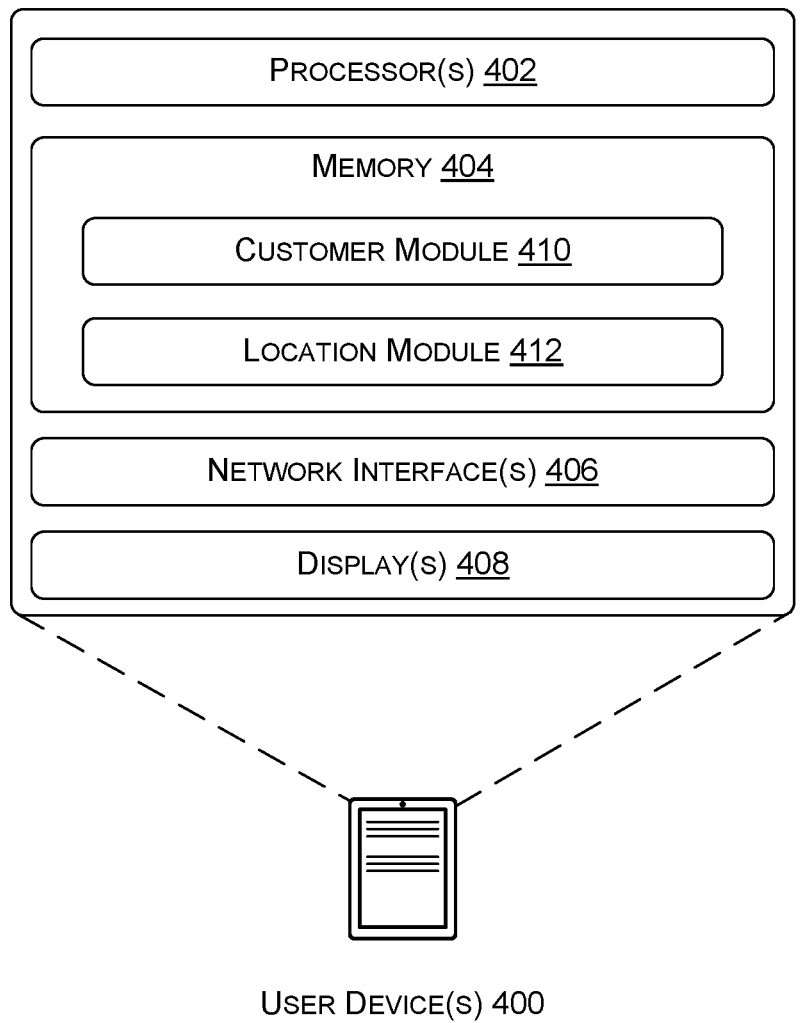
FIG. 4 illustrates example details of a user device.

FIG. 4 illustrates example details of a user device 400. The user device 400 may be employed by the user 108 of FIG. 1. The user device 400 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., a navigation system), an appliance, a camera, a robot, a hologram system, a security system, a home-based computer system (e.g., intercom system, home media system, etc.), a projector, an automated teller machine (ATM), and so on. In some instances, the user device 400 may be a mobile device.

The user device 400 may include one or more processor(s) 402, memory 404, one or more communication network interface(s) 406, and one or more display(s) 408. The one or more processor(s) 402 may include a central processing unit (CPU), a graphics processing unit (GPU), a microprocessor, a digital signal processor, and so on. The one or more displays 408 may include a touch screen, a Liquid-crystal Display (LCD), a Light-emitting Diode (LED) display, an organic LED display, a plasma display, an electronic paper display, or any other type of technology. Although not illustrated, the user device 400 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or other sensor. The user device 400 may additionally include, or be associated with, input device(s) such as a keyboard, a mouse, a pen, a voice input device, a touch input device, etc. The memory 404 may include a customer module 410 and a location module 412.

The customer module 410 (e.g., customer application) may provide functionality to enable a user to order an item and/or process a transaction for the item. The customer module 410 may provide various interfaces and/or dashboards (e.g., a customer interface). For example, the customer module 410 may enable a user to view information regarding items offered by a merchant (e.g., delivery times, pricing, etc.), order an item, view proposals received from the service provider 102, selects options within the proposals, communicate with a courier, and/or track an order. Additionally, or alternatively, the customer module 410 may enable the user to provide payment for an item (e.g., via a card reader, NFC connection to a merchant device, Bluetooth® connection to a merchant device, etc.), receive receipts for items, and so on. Further, the customer module 410 may enable the user to check in to a merchant to carry out a card-less payment transaction, such as in the case when the user is picking up an item from the merchant (e.g., in a takeout context). Moreover, the customer module 410 may provide a variety of other functionality to order an item and/or process a transaction.

In some instances, such as when a user acts as a courier, the customer module 410 may provide the user with the same functionality as the courier module 310. For instance, the customer module 410 may receive order information from the service provider 102 and use the order information to provide the user with information for picking up the order from a merchant's pickup location. The customer module 410 may further enable the user to respond to the service provider 102 to confirm acceptance of picking up the order. In some instances, the customer module 410 may receive updated delivery information (e.g., pickup time, etc.) after an order has been accepted. The updated delivery information may be due to a merchant transitioning from one mode to another mode, causing a preparation time to be updated. The customer module 410 may provide various interfaces and/or dashboards (e.g., a courier interface).

In some instances, to provide the user with the same functionality as the courier module 310, the customer module 410 may include at least a portion of the same computer-executable code as the courier module 310. As such, based on including at least a portion of the same computer-executable code, the customer module 410 may provide the user with similar functionality as the courier module 310 provides the courier.

The location module 412 may determine a location of the user device 400. In some instances, the location is provided to the service provider 102, or used locally, to facilitate various functions, such as processing of transactions when a user is located within a particular proximity to a merchant device. The location module 412 may determine a geographic location of the user device 400 from geolocation techniques (e.g., satellite-based systems—global positioning system (GPS)), cell tower location data, wireless access point location data, wireless beacon location, and so forth. As such, the location module 412 may utilize data from a location sensor of the user device 400, such as a GPS receiver or communication interface that can determine (e.g., from cell towers or wireless access points) a geographic location of the user device 400.

The merchant module 210, courier module 310, and/or customer module 410 may be implemented in various manners, such as a mobile application, desktop application, a web browser, and so on.

Figure 5:
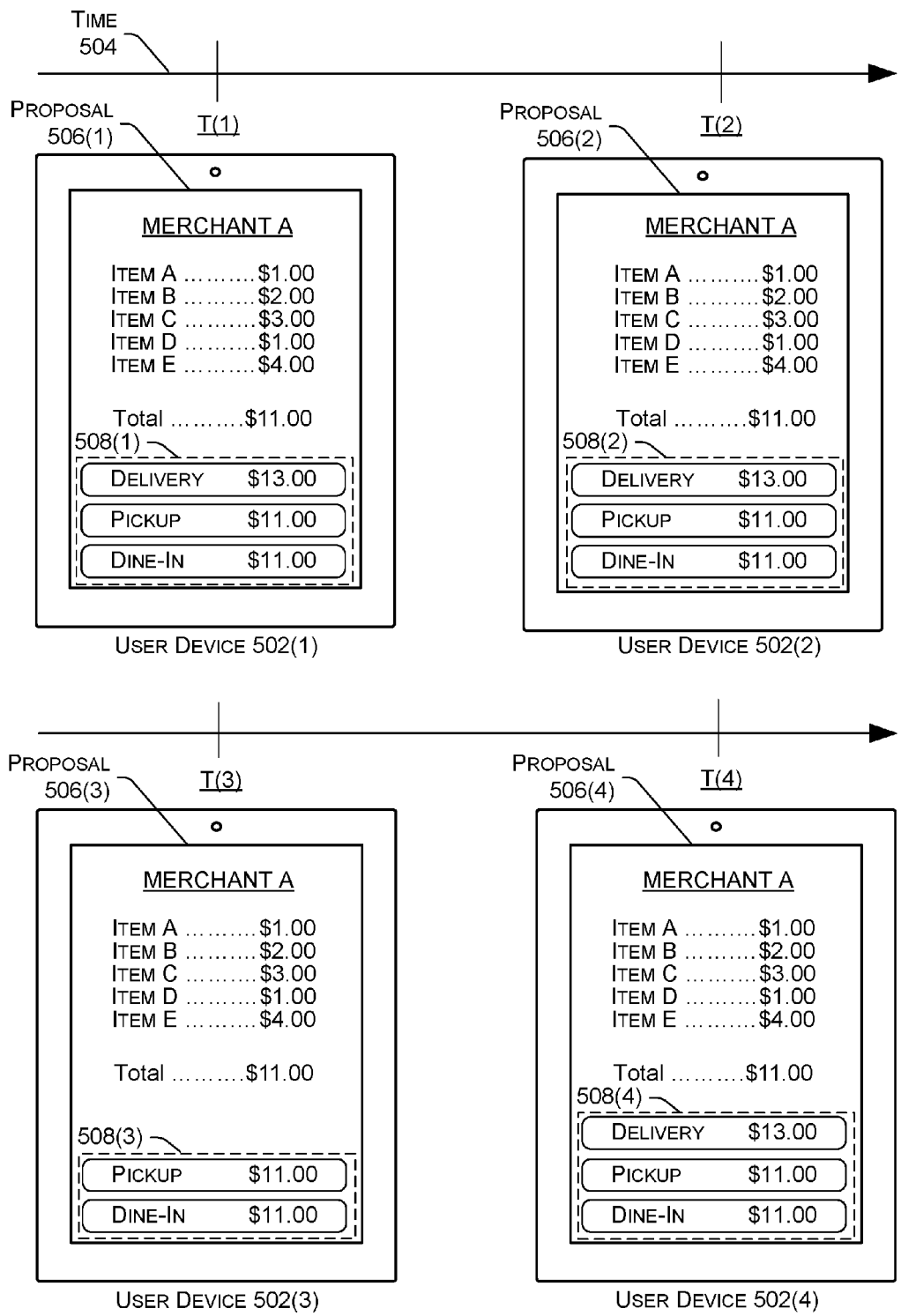
FIG. 5 illustrates an example of providing options for fulfilling orders.

FIG. 5 illustrates an example of providing options for fulfilling orders. In the example of FIG. 5, four user device(s) 502(1)-(4), which may each represent a user device 400, order the same Items A-E from Merchant A over a given period of time 504. For instance, at time T(1), the first user device 502(1) may send a request for Items A-E to the service provider 102 and, in response, receive a first proposal 506(1) from the service provider 102. The first proposal 506(1) includes three options 508(1) for fulfilling the order of Items A-E, which include delivery for $13.00 (e.g., the cost of Items A-E plus a delivery charge of $2.00), pickup for $11.00, and dine-in for $11.00. At time T(2), the second user device 502(2) may send a request for Items A-E to the service provider 102 and, in response, receive a second proposal 506(2) from the service provider 102. The second proposal 506(2) also includes three options 508(2) for fulfilling the order of Items A-E, which include delivery for $13.00 (e.g., the cost of Items A-E plus the delivery charge of $2.00), pickup for $11.00, and dine-in for $11.00.

At time T(3), the third user device 502(3) may send a request for Items A-E to the service provider 102 and, in response, receive a third proposal 506(3) from the service provider 102. The third proposal 506(3) includes two options 508(3) for fulfilling the order of Items A-E, which include pickup for $11.00 and dine-in for $11.00. Finally, at time T(4), the fourth user device 502(4) may send a request for Items A-E to the service provider 102 and, in response, receive a fourth proposal 506(4) from the service provider 102. The fourth proposal 506(4) includes three options 508(4) for fulfilling the order of Items A-E, which include delivery for $13.00 (e.g., the cost of Items A-E plus the delivery charge of $2.00), pickup for $11.00, and dine-in for $11.00.

In some instances, the service provider 102 may generate each of the proposals 506(1)-(4) based on a state of couriers that delivery orders to users. For instance, at time T(1), the service provider 102 may determine that the state of the couriers indicates that there is not a shortage of couriers and as such, the service provider 102 may generate the first proposal 506(1) to include options for fulfilling the order by delivery, pickup, and dine-in. At time T(2), the service provider 102 may determine that the state of the couriers still indicates that there is not a shortage of couriers and as such, the service provider 102 may generate the second proposal 506(2) to include options for fulfilling the order by delivery, pickup, and dine-in. At time T(3), the service provider 102 may determine that the state of the couriers indicates that there now a shortage of couriers and as such, the service provider 102 may generate the third proposal 506(3) to only include options for fulfilling the order by pickup and dine-in. Finally, at time T(4), the service provider 102 may determine that the state of the couriers indicates that there is again not a shortage of couriers and as such, the service provider 102 may generate the fourth proposal 506(4) to include options for fulfilling the order by delivery, pickup, and dine-in.

Figure 6:
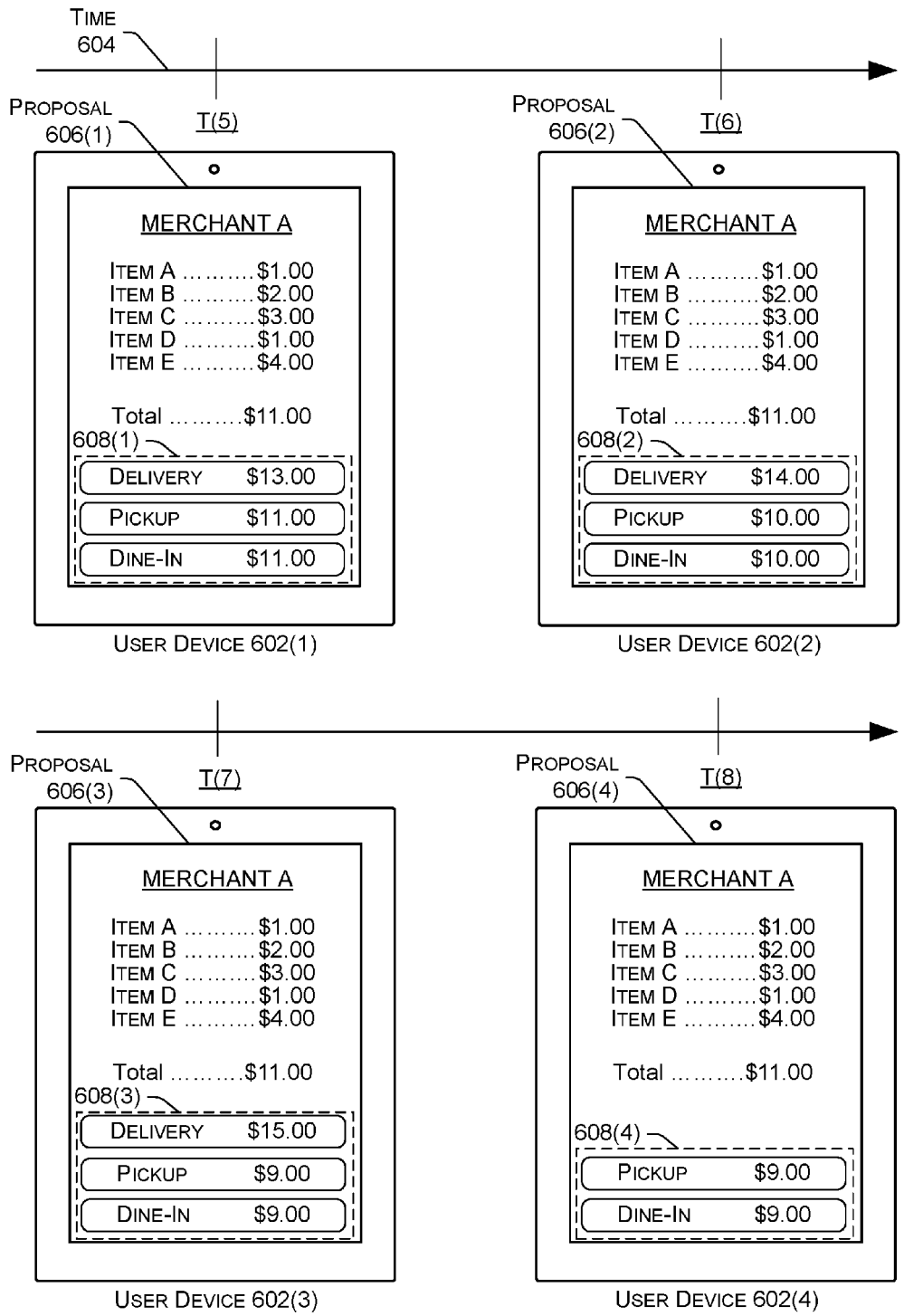
FIG. 6 illustrates and example of providing incentivized options for fulfilling orders.

Additionally, or alternatively, the service provider 102 may generate proposals that include incentives. For instance, FIG. 6 illustrates and example of providing incentivized options for fulfilling orders. In the example of FIG. 6, four user device(s) 602(1)-(4), which may each represent a user device 400, order the same Items A-E from Merchant A over a given period of time 604. For instance, at time T(5), the first user device 602(1) may send a request for Items A-E to the service provider 102 and, in response, receive a first proposal 606(1) from the service provider 102. The first proposal 606(1) includes three options 608(1) for fulfilling the order of Items A-E, which include delivery for $13.00 (e.g., the cost of Items A-E plus a delivery charge of $2.00), pickup for $11.00, and dine-in for $11.00. At time T(6), the second user device 602(2) may send a request for Items A-E to the service provider 102 and, in response, receive a second proposal 606(2) from the service provider 102. The second proposal 606(2) also includes three options 609(2) for fulfilling the order of Items A-E, which include delivery for $14.00 (e.g., the cost of Items A-E, plus the delivery charge of $2.00 and a first delivery surcharge of $1.00), pickup for $10.00 (e.g., the cost of Items A-E minus a first incentive of $1.00), and dine-in for $10.00 (e.g., the cost of Items A-E minus the first incentive of $1.00).

At time T(7), the third user device 602(3) may send a request for Items A-E to the service provider 102 and, in response, receive a third proposal 606(3) from the service provider 102. The third proposal 606(3) includes three options 608(3) for fulfilling the order of Items A-E, which include delivery for $15.00 (the cost of Items A-E, plus the delivery charge to $2.00 and a second delivery surcharge of $2.00), pickup for $9.00 (e.g., the cost of Items A-E minus a second incentive of $2.00), and dine-in for $9.00 (e.g., the cost of Items A-E minus the second incentive of $2.00). Finally, at time T(8), the fourth user device 602(4) may send a request for Items A-E to the service provider 102 and, in response, receive a fourth proposal 606(4) from the service provider 102. The fourth proposal 606(4) includes two options 608(4) for fulfilling the order of Items A-E, which include pickup for $9.00 (e.g., the cost of Items A-E minus the second incentive of $2.00) and dine-in for $9.00 (e.g., the cost of Items A-E minus the second incentive of $2.00).

In some instances, the service provider 102 may generate each of the proposals 606(1)-(4) based on a state of couriers that delivery orders to users. For instance, at time T(5), the service provider 102 may determine that the state of the couriers indicates that there is not a shortage of couriers and as such, the service provider 102 may generate the first proposal 606(1) to include options for fulfilling the order by delivery, pickup, and dine-in. Additionally, the service provider 102 may generate the first proposal 606(1) such that the cost for pickup and dine-in includes the cost of Items A-E, and the cost for delivery includes the cost of Items A-E plus a standard delivery charge (e.g., $2.00 in this example).

At time T(6), the service provider 102 may determine that the state of couriers indicates that there is a shortage of couriers. Additionally, the service provider 102 may determine that there is a shortage of couriers that falls within a first threshold range (e.g., between zero and a first value) and as such, the shortage level is at a first level. In response, the service provider 102 may generate the second proposal 606(2) to include options for fulfilling the order by delivery, pickup, and dine-in. Additionally, the service provider 102 may generate the second proposal 606(2) such that the cost for pickup and dine-in includes the cost of Items A-E minus a first incentive (e.g., $1.00), and the cost for delivery includes the cost of Items A-E, plus the standard delivery charge (e.g., $2.00) and a first delivery surcharge (e.g., $1.00).

At time T(7), the service provider 102 may determine that the state of couriers indicates that there is a shortage of couriers. Additionally, the service provider 102 may determine that there is a shortage of couriers that falls within a second threshold range (e.g., between the first value and a second value) and as such, the shortage level is at a second level. In response, the service provider 102 may generate the third proposal 606(3) to include options for fulfilling the order by delivery, pickup, and dine-in. Additionally, the service provider 102 may generate the third proposal 606(3) such that the cost for pickup and dine-in includes the cost of Items A-E minus a second incentive (e.g., $2.00), and the cost for delivery includes the cost of Items A-E, plus the standard delivery charge (e.g., $2.00) and a second delivery surcharge (e.g., $2.00).

Finally, at time T(8), the service provider 102 may determine that the state of couriers indicates that there is a shortage of couriers. Additionally, the service provider 102 may determine that there is a shortage of couriers that falls within a third threshold range (e.g., between the second value and a third value) and as such, the shortage level is at a third level. In response, the service provider 102 may generate the fourth proposal 606(4) to include options for fulfilling the order by pickup and dine-in. Additionally, the service provider 102 may generate the fourth proposal 606(4) such that the cost for pickup and dine-in includes the cost of Items A-E minus the second incentive (e.g., $2.00).

In some instances, in addition to, or alternatively from, utilizing different incentives and/or delivery charges based on the shortage level, the service provider 102 may utilize the same incentive and/or delivery charge for one or more shortage levels. Additionally, in some instances, the service provider 102 may utilize incentives and/or delivery charges during periods of time when there is not a shortage of couriers to fulfill orders.

Figure 7:
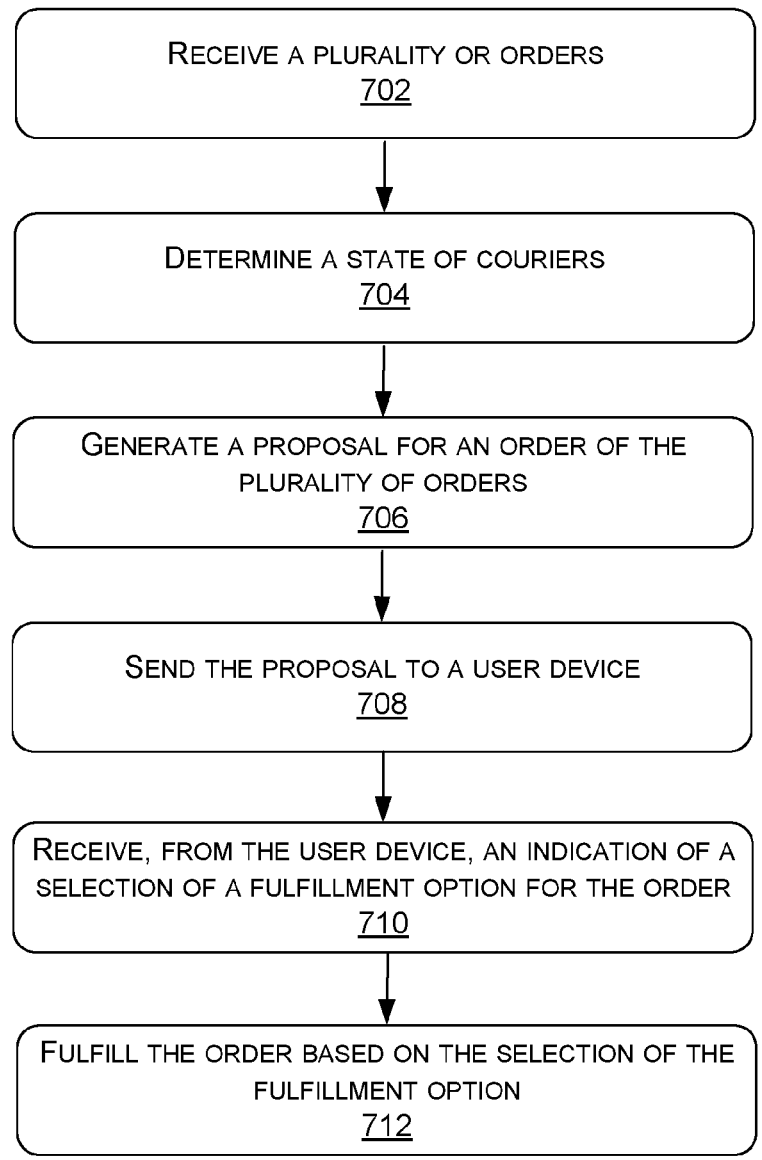
FIG. 7 illustrates an example process for providing options for filling orders.

FIG. 7 illustrates an example process 700 for providing options for filling orders. The process 700, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 700, and other processes described herein, may be performed by a service provider, a merchant device, a user device, a courier device, an additional electronic device, or by a combination thereof.

At 702, the service provider 102 receives a plurality of orders. For instance, the service provider 102 can receive a plurality of orders from a plurality of user devices, where each order of the plurality of orders is for an item (e.g., a menu item) to be prepared by a respective merchant. In some instances, the service provider 102 may receive the plurality of orders via applications executing on the plurality of user devices. In some instances, the service provider 102 may further receive a respective location from each of the plurality of user devices, where the respective location indicates a geographical location of a respective user device.

At 704, the service provider 102 determines a state of couriers. For instance, the service provider 102 can receive a respective location from each of a plurality of courier devices, where the respective location indicates a geographical location of a respective courier device. The service provider 102 can then determine the state of the couriers based on the plurality of orders, the locations of the plurality of user devices, and the locations of the plurality of courier devices. In some instances, the state can indicate whether there is a shortage of couriers. In some instances, if there is a shortage of couriers, the state can further indicate a shortage level for the couriers.

At 706, the service provider 102 generates a proposal for an order of the plurality of orders. For instance, the service provider 102 can generate the proposal based on the state of the couriers. In some instances, to generate the proposal based on the state, the service provider 102 determines which fulfillment options to include in the proposal based on the state of the couriers, where each fulfillment option is associated with a respective approach (e.g., delivery, pickup, dine-in) to fulfill the order. In some instances, to generate the proposal based on the state, the service provider 102 can further determine whether to provide one or more incentives within the proposal.

For example, based on the state of the couriers indicating that there is not a shortage of couriers, the service provider 102 can generate the proposal to include options for fulfilling the order by delivery, pickup, and dine-in. The service provider 102 can further determine a respective cost associated with each of the options, and include the costs within the proposal. For a second example, based on the state of the couriers indicating that there is a shortage couriers, the service provider 102 can still generate the proposal to include options for fulfilling the order by delivery, pickup, and dine-in. However, the service provider 102 can further determine one or more incentives to include in the proposal for one or more of the costs, and include the incentives along with the costs in the proposal.

Still, for a third example, based on the state of the couriers indicating that there is a shortage couriers, the service provider 102 can generate the proposal to include options for fulfilling the order by pickup and dine-in, but not including an option to fulfill the order by delivery. The service provider 102 can then determine a respective cost associated with each of the pickup and the dine-in options, and include the costs within the proposal.

At 708, the service provider 102 sends the proposal to a user device and at 710, the service provider 102 receives, from the user device, an indication of a selection of a fulfillment option for the order. For instance, the service provider 102 can send the proposal to the user device via an application executing on the user device. The user device can receive the proposal from the service provider 102 and display the proposal using a user interface. While displaying the proposal, the user device can receive input indicating a selection a fulfillment option from the one or more fulfillment options. The user device can then send an indication of the selection to the service provider 102.

At 712, the service provider 102 fulfills the order based on the selection of the fulfillment option. For instance, if the selection indicates a fulfillment by delivery, the service provider 102 can identify a courier to fulfill delivery of the order and send a courier device associated with the courier instructions for delivering the item to the user. The courier device can receive the instruction from the service provider and provide the instructions to the courier (e.g., display to the courier using a display). Additionally, the service provider 102 can send a merchant device associated with the merchant information associated with the order, including an indication of when the menu item should be prepared and an indication of that the order will be fulfilled by the courier. The merchant device can receive the information from the service provider 102 an in response, provide the information to the merchant (e.g., display to the merchant).

If the selection indicates fulfillment by pickup, the service provider 102 can send a merchant device associated with the merchant information associated with the order, including an indication of when the menu item should be prepared and an indication of that the order will be fulfilled by the customer. The merchant device can receive the information from the service provider 102 an in response, provide the information to the merchant (e.g., display to the merchant).

Additionally, if the selection indicates fulfillment by dine-in, the service provider 102 can send a merchant device associated with the merchant information associated with the order, including an indication of when the menu item should be prepared and an indication of that the order will be fulfilled by the customer dining in at the establishment of the merchant. The merchant device can receive the information from the service provider 102 an in response, provide the information to the merchant (e.g., display to the merchant).

In some instances, the service provider 102 can perform steps 706-710 for one or more additional orders. For instance, the service provider 102 can generate a second proposal for a second order based on the state of the couriers. In some instances, the second proposal can include fewer or more fulfillment options. The service provider 102 can then send the second proposal to a second user device and in response, receive an indication of a selection of a fulfillment option of one or more fulfillment options provided in the second proposal.

Figure 8:
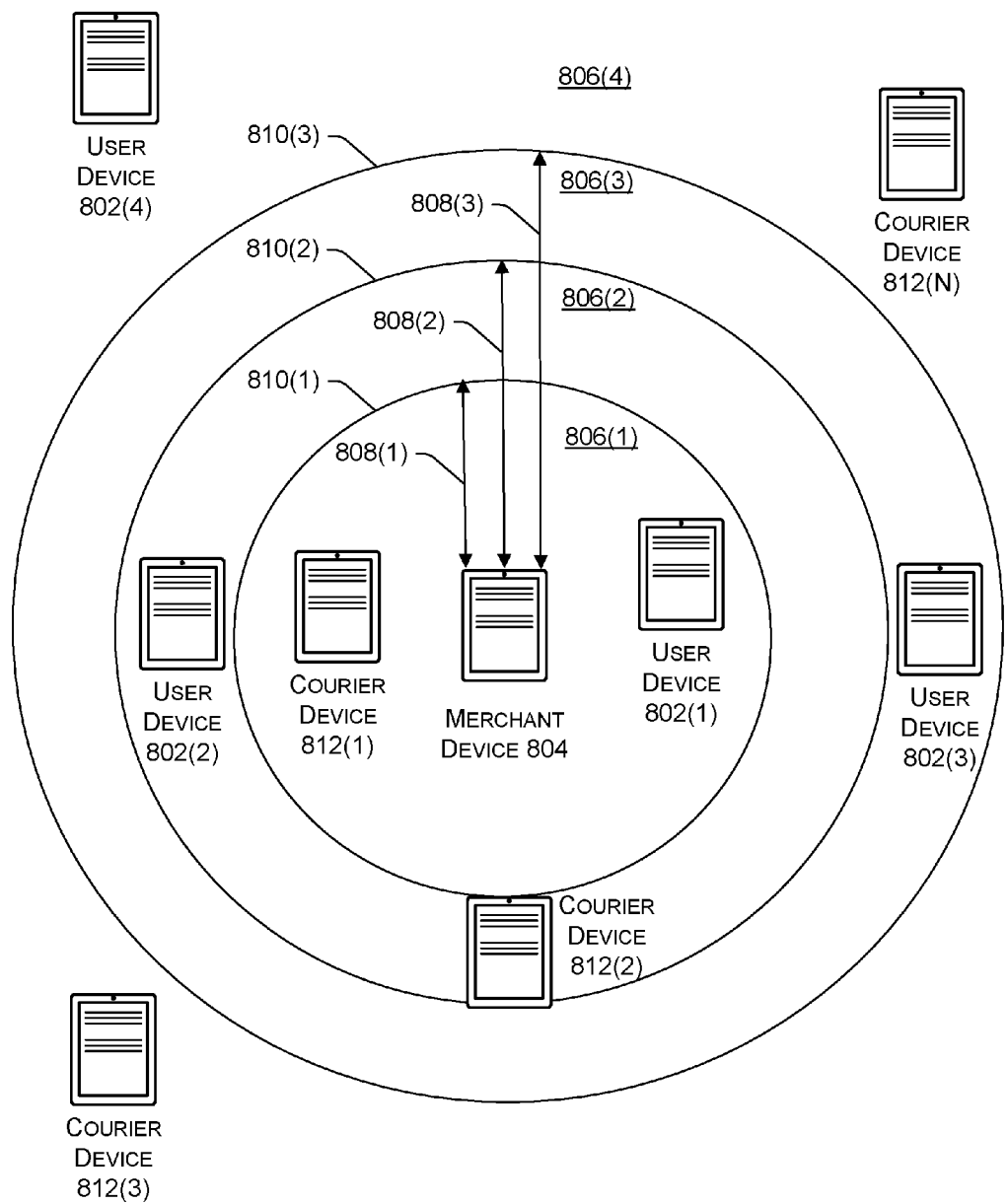
FIG. 8 illustrates an example of determining delivery regions for customers ordering items from a merchant.

FIG. 8 illustrates an example of generating delivery regions for users ordering items from a merchant. For instance, as illustrated in FIG. 8, user devices 802(1)-(4), which may each represent a user device 400, are located around a merchant device 804, which may represent a merchant device 200. Additionally, each of the user devices 803(1)-(4) may be sending respective requests associated with respective orders to the service provider 102, where each order is for one or more items from a merchant associated with the merchant device 804.

The service provider 102 can determine one or more delivery regions 806(1)-(4) associated with the merchant. In some instances, the service provider 102 determines the one or more delivery regions 806(1)-(4) based on one or more distances 808(1)-(3) from the merchant. For instance, the service provider 102 can determine a first delivery region 806(1) that includes an area around the merchant that encompasses a first threshold distance 808(1) around a location of the merchant (i.e., area within the first boundary 810(1)). The service provider 102 can further determine a second delivery region 806(2) that includes an area around the merchant that is between the first threshold distance 808(1) and a second threshold distance 808(2) (i.e., area between the first boundary 810(1) and the second boundary 810(2)). Additionally, the service provider 102 can determine a third delivery region 806(2) that includes an area around the merchant that is between the second threshold distance 808(2) and a third threshold distance 808(3) (i.e., area between the second boundary 810(2) and the third boundary 810(3)). Finally, the service provider 102 can determine a fourth delivery region 806(4) that includes everything outside of the third threshold distance 808(3) (i.e., area outside of the third boundary 810(3)).

While the example of FIG. 8 only illustrates determining boundaries 810(1)-(3) for delivery regions 806(1)-(4) based on distances 808(1)-(4) from the merchant, the service provider 102 can determine the boundaries 801(1)-(3) based on isochrones. In some instances, isochrones represent lines around the merchant that connect points at which arrival to the points from the merchant are equal in time. For instance, a first boundary may represent a line around the merchant that connects respective points in which is takes couriers a first amount of time to reach (e.g., one minute), a second boundary may represent a line around the merchant that connects respective points in which is takes the couriers a second amount of time to reach (e.g., five minutes), a third boundary may represent a line around the merchant that connects respective points in which is takes the couriers a third amount of time to reach (e.g., ten minutes), or the like.

When determining boundaries 810(1)-(3), either using distances 808(1)-(3) or isochrones, the service provider 102 may utilize one or more factors. For instance, the service provider 102 may determine the boundaries 810(1)-(3) based on a state of the couriers, locations of respective courier devices 812(1)-(N) (which may each represent a courier device 300), locations of respective user devices 802(1)-(4), a number of orders that the service provider 102 receives from respective user device 802(1)-(4), a number of orders that the service provider 102 is in the process of delivering, a number of potential orders that the service provider 102 may receive from additional user devices, the geographical location of the merchant, the geographical layout of a region in which the merchant is located, the weather, traffic conditions, a time of day, a time of year, and/or the like.

For example, based on the state indicating that there is not a shortage of couriers, the service provider 102 may only use a single threshold distance (and/or single isochrone) to determine two delivery regions. For instance, the service provider 102 may use the third threshold distance 808(3) to determine a first delivery region that encompasses delivery regions 806(1)-(3) and a second delivery region that encompasses delivery region 806(4). For another example, based on the state indicating that there is a shortage of couriers, the service provider 102 may use two or more threshold distances (and/or two or more isochrones) to determine three or more delivery regions. For instance, the service provider 102 may use the first threshold distance 808(1) and the second threshold distance 808(3) to determine a first delivery region that encompasses delivery region 806(1), a second delivery region that encompasses delivery regions 806(2)-(3), and a third delivery region that encompasses delivery region 806(4).

For another example, the service provider 102 may determine delivery regions based on a shortage level. For example, the service provider 102 may determine a number of the delivery regions and/or a size of each delivery region based on the shortage level. For instance, the service provider 102 may determine two delivery regions when the state of the couriers indicates that there is not a shortage of couriers, determine three delivery regions when the state of the couriers indicates shortage level one, determine four delivery regions when the state of the couriers indicates shortage level two, and so forth.

In some instances, the service provider 102 can update one or more of the delivery regions 806(1)-(4). For example, the service provider 102 can update the size, number, and/or shape of delivery regions based on the state of the couriers changing from indicating a shortage of couriers to indicating that there is not a shortage of couriers and/or changing from indicating that there is not a shortage of couriers to indicating that there is a shortage of couriers. For another example, the service provider 102 can update the size, number, and/or shape of the delivery regions based on the shortage level for the couriers increasing and/or decreasing. In some instances, the service provider 102 updates the delivery regions whenever the state of the couriers and/or the shortage level change. In some instances, the service provider 102 updates the delivery regions at specific time intervals, such as every minute, hour, or the like.

In some instances, the service provider 102 may then associate the delivery regions 806(1)-(4) with one or more fulfillment options. For instance, the service provider may associate each of delivery regions 806(1)-(4) with one or more of a first option for fulfilling orders by pickup, a second option for fulfilling orders by delivery, and a third option for fulfilling orders by dine-in. In some instances, the service provider 102 associates the delivery regions 806(1)-(4) with the fulfillment options based on the state of the couriers and/or a shortage level associated with the couriers.

For example, and using the example above, based on the state of the couriers indicating that there is not a shortage of couriers, the service provider 102 may use the third threshold distance 808(3) to determine a first delivery region that encompasses delivery regions 806(1)-(3) and a second delivery region that encompasses delivery region 806(4). The service provider 102 may then associate the first delivery region with a first option for fulfilling orders by pickup, a second option for fulfilling orders by delivery, and a third option for fulfilling orders by dine-in. The service provider may further associate the second delivery region with the first option for fulfilling orders by pickup and the third option for fulfilling orders by dine-in, but refrain from associating the second delivery region with the second option for fulfilling orders by delivery.

For another example, based on the state indicating that there is a shortage of couriers, the service provider 102 may use two or more threshold distances (and/or two or more isochrones) to determine three or more delivery regions. For instance, the service provider 102 may use the first threshold distance 808(1) and the second threshold distance 808(3) to determine a first delivery region that encompasses delivery region 806(1), a second delivery region that encompasses delivery regions 806(2)-(3), and a third delivery region that encompasses delivery region 806(4). The service provider 102 may then associate the first delivery region with options to fulfill orders by pickup and dine-in, but not delivery, associate the second delivery region with options to fulfill order by pickup, delivery, and dine-in, and associate the third delivery region with options to fulfill orders by pickup and dine-in, but not delivery.

It should be noted that, even though the example of FIG. 8 shows the delivery regions as including circular rings, the example of FIG. 8 is not intended to be limiting. For instance, in some examples, delivery regions can include any type of shape. Additionally, in some instance, one or more delivery regions may be separated from, and not included in, other delivery regions. For instance, the service provider may determine that a first delivery region including an area to the west of a merchant and a second delivery region includes an area to the east of the merchant.

Figure 9:
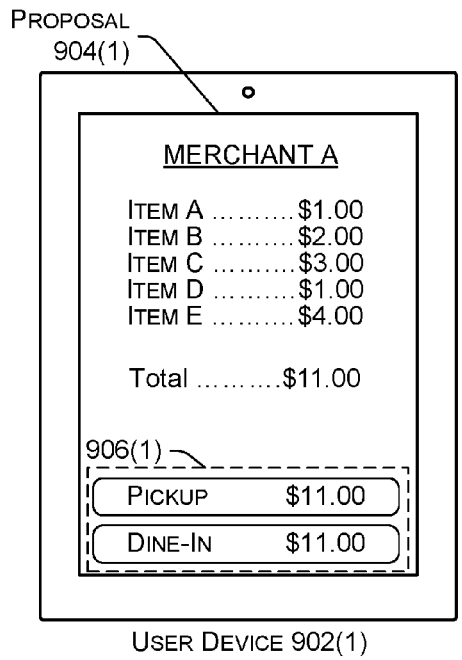
FIG. 9 illustrates an example of utilizing the delivery regions when providing options for fulfilling orders.
Figure 9:
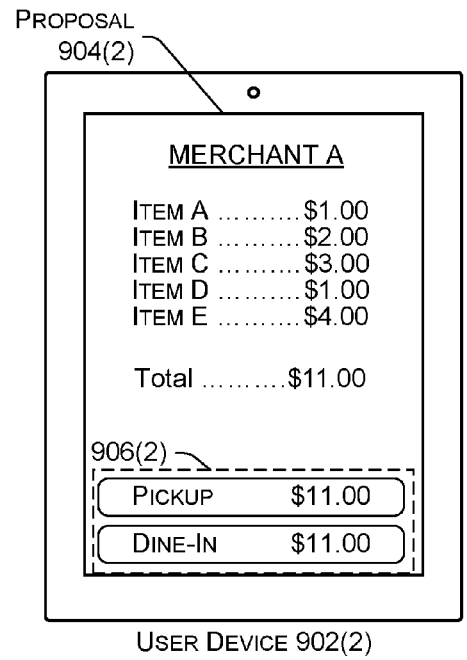
Figure 9:
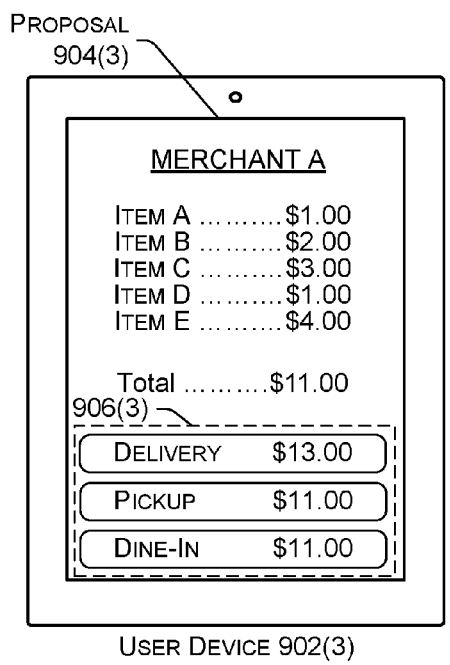
Figure 9:
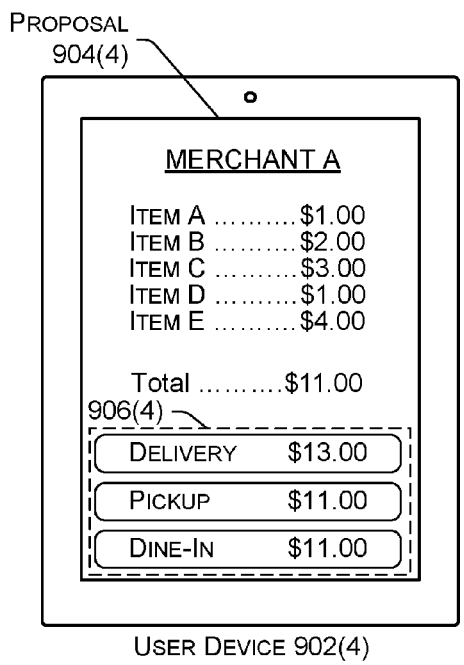

In some instances, the service provider 102 may determine which fulfillment options to provide in proposals based on the delivery regions. For instance, FIG. 9 illustrates an example of utilizing the delivery regions when providing options for fulfilling orders to user devices 902(1)-(4), where each user device 902(1)-(4) can represent a user device 400. As illustrated, a first user device 902(1) may send a request for Items A-E to the service provider 102 and, in response, receive a first proposal 904(1) from the service provider 102. The first proposal 904(1) includes two options 904(1) for fulfilling the order of Items A-E, which include pickup for $11.00 and dine-in for $11.00. Additionally, a second user device 902(2) may send a request for Items A-E to the service provider 102 and, in response, receive a second proposal 904(2) from the service provider. The second proposal 904(2) also includes two options 904(2) for fulfilling the order of Items A-E, which include pickup for $11.00 and dine-in for $11.00.

Moreover, a third user device 902(3) may send a request for Items A-E to the service provider 102 and, in response, receive a third proposal 904(3) from the service provider 102. The third proposal 904(3) includes three options 904(3) for fulfilling the order of Items A-E, which include delivery for $13.00 (e.g., the cost of Items A-E plus a delivery charge of $2.00), pickup for $11.00, and dine-in for $11.00. Finally, a fourth user device 902(4) may send a request for Items A-E to the service provider 102 and, in response, receive a fourth proposal 904(4) from the service provider 102. The fourth proposal 904(4) includes three options 904(4) for fulfilling the order of Items A-E, which include delivery for $13.00 (e.g., the cost of Items A-E plus a delivery charge of $2.00), pickup for $11.00, and dine-in for $11.00.

In some instances, the service provider 102 may utilize one or more delivery regions (e.g., delivery regions 806(1)-(4)) when generating the proposals 904(1)-(4). For instance, in the example of FIG. 9, the service provider 102 may use a first delivery region in which the first user device 902(1) and the second user device 902(2) are each located, and a second delivery region in which the third user device 902(3) and the fourth user device 902(4) are each location. For example, based on the first user device 902(1) and the second user device 902(2) each being located within the first delivery region, the service provider 102 generates the first proposal 904(1) and the second proposal 904(2) for the first user device 902(1) and the second user device 902(2), respectively, to include options for pickup and dine-in. Additionally, based on the third user device 902(3) and the fourth user device 902(4) each being located within the second delivery region, the service provider 102 generates the third proposal 904(3) and the fourth proposal 904(4) for the third user device 902(3) and the fourth user device 902(4), respectively, to include options for delivery, pickup, and dine-in.

In some instances, the example of FIG. 9 may correspond to a situation in which there is a shortage of couriers. For example, the first delivery region may be closer to the merchant than the second delivery region. In such an example, using the two delivery regions, the service provider 102 may determine that users (e.g., users associated respectively with the first user device 902(1) and the second user device 902(2)) that are within the first delivery region are close enough to the merchant to pick up orders. As such, the service provider 102 may generate proposals for users that are located within the first delivery region that include options for pickup and dine-in, but not options for delivery. Additionally, even though there is a shortage of couriers, the service provider 102 may determine that users (e.g., users associated respectively with the third user device 902(3) and the fourth user device 902(4)) that are located within the second delivery region are far enough away from the merchant that the service provider 102 is still going to provide the option for delivering orders. As such, the service provider 102 may generate proposals for users that are located within the second delivery region that include options for delivery, pickup, and dine-in.

For another example, the second delivery region may be closer to the merchant than the first delivery region. In such an example, using the two delivery regions, the service provider 102 may determine that users (e.g., users associated respectively with the first user device 902(1) and the second user device 902(2)) that are within the first delivery region are too far away from the merchant for delivery by a courier. As such, the service provider 102 may generate proposals for users that are located within the first delivery region that include options for pickup and dine-in. Additionally, even though there is a shortage of couriers, the service provider 102 may determine that users (e.g., users associated respectively with the third user device 902(3) and the fourth user device 902(4)) that are located within the second delivery region are close enough to the merchant that the service provider 102 is still going to provider delivery service (e.g., delivery may be quick). As such, the service provider 102 may generate proposals for users that are located within the second delivery region that include options for pickup and dine-in, but not the option for delivery.

Even though the above describes examples where there is a shortage of couriers, similar techniques can be used when there is not a shortage of couriers. For example, when there is not a shortage of couriers, the service provider 102 may determine a first delivery region and a second delivery region, where the first delivery region is closer to the merchant than the second delivery region. Using the two delivery regions, the service provider 102 may determine that users that are within the first delivery region are close enough to the merchant that the service provider 102 will provide the option for fulfilling orders by delivery. As such, in such an example, the service provider 102 may generate proposals for users that are within the first delivery region that include options for delivery, pickup, and dine-in. Additionally, even though there is not a shortage of couriers in such an example, the service provider 102 may determine that users that are within the second delivery region are too far away from the merchant to fulfill orders by delivery. As such, the service provider 102 may generate proposals for users located within the second delivery region that include options for pickup and dine-in, but not the option for delivery.

Figure 10:
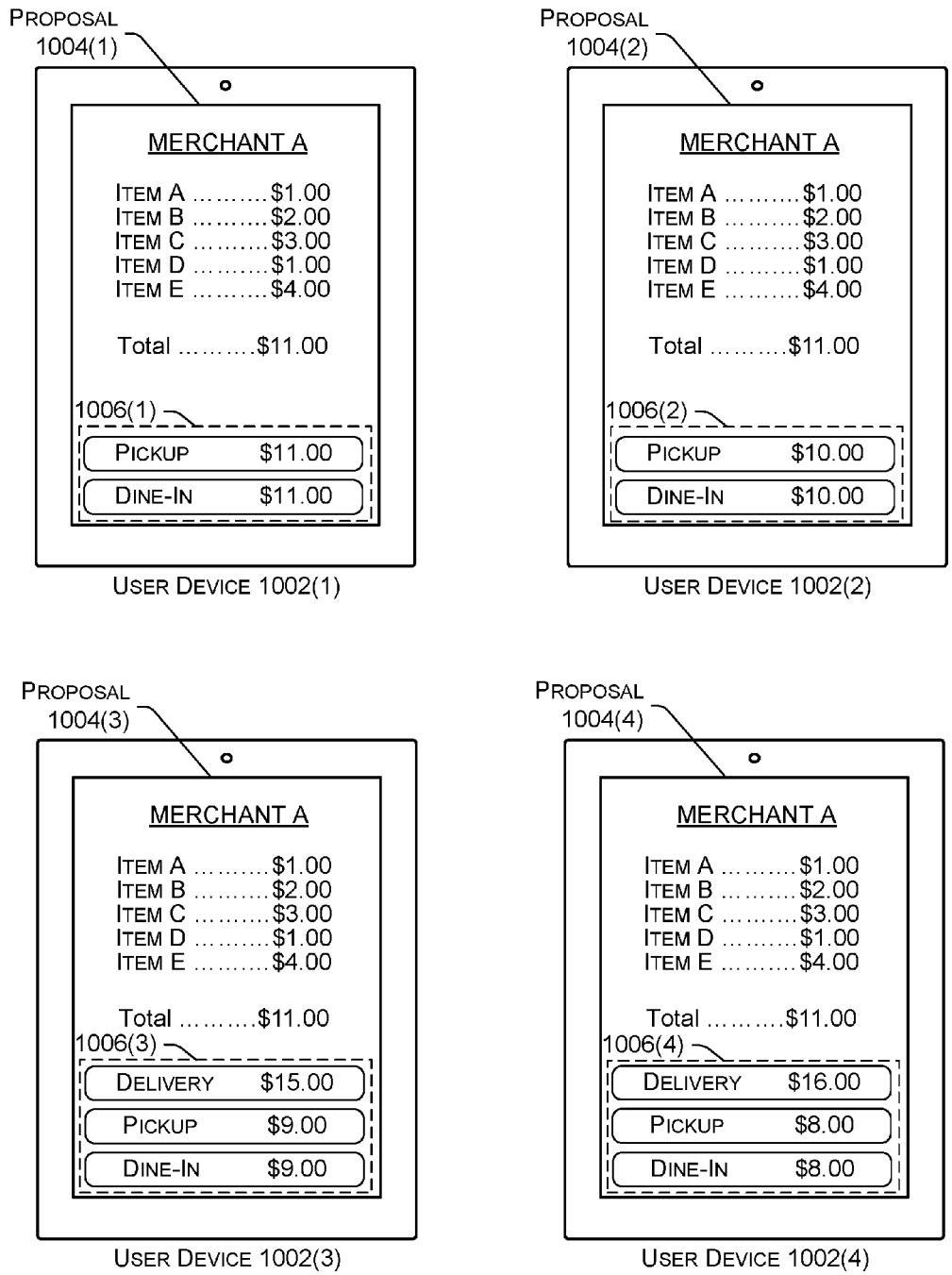
FIG. 10 illustrates an example of utilizing the delivery regions when providing incentivized options for fulfilling orders.

In some instances, the service provider 102 may determine which fulfillment options to provide in proposals based on the delivery regions. For instance, FIG. 10 illustrates an example of utilizing delivery regions to provide incentivized options within proposals. As shown, user devices 1002(1)-(4), which can each represent a user device 400, respectively receive proposals 904(1)-(4). For instance, a first user device 1002(1) may send a request for Items A-E to the service provider 102 and, in response, receive a first proposal 1004(1) from the service provider 102. The first proposal 1004(1) includes two options 1006(1) for fulfilling the order of Items A-E, which include pickup for $11.00 and dine-in for $11.00. Additionally, a second user device 1002(2) may send a request for Items A-E to the service provider 102 and, in response, receive a second proposal 1004(2) from the service provider 102. The second proposal 1004(2) also includes two options 1006(2) for fulfilling the order of Items A-E, which include pickup for $10.00 (e.g., the cost of Items A-E minus a first incentive of $1.00) and dine-in for $10.00 (e.g., the cost of Items A-E minus a first incentive of $1.00).

Moreover, a third user device 1002(3) may send a request for Items A-E to the service provider 102 and, in response, receive a third proposal 1004(3) from the service provider 102. The third proposal 1004(3) includes three options 1006(3) for fulfilling the order of Items A-E, which include delivery for $15.00 (e.g., the cost of Items A-E, plus a delivery charge of $2.00 and a first delivery surcharge of $2.00), pickup for $9.00 (e.g., the cost of Items A-E minus a second incentive of $2.00), and dine-in for $9.00 (e.g., the cost of Items A-E minus the second incentive of $2.00). Finally, a fourth user device 1002(4) may send a request for Items A-E to the service provider 102 and, in response, receive a fourth proposal 1004(4) from the service provider 102. The fourth proposal 1004(4) includes three options 1006(4) for fulfilling the order of Items A-E, which include delivery for $16.00 (e.g., the cost of Items A-E, plus a delivery charge of $2.00 and a delivery surcharge of $300), pickup for $8.00 (e.g., the cost of Items A-E minus a third incentive of $3.00), and dine-in for $8.00 (e.g., the cost of Items A-E minus the third incentive of $3.00).

In the example of FIG. 10, the service provider 102 may utilize one or more delivery region when generating the proposals 1004(1)-(4). For instance, the service provider 102 may utilize a first delivery region in which the first user device 1002(1) is located, a second delivery region in which the second user device 1002(2) is located, a third delivery region in which the third user device 1002(3) is located, and a fourth delivery region in which the fourth user device 1002(4) is located. In some examples, the first delivery region is the closest delivery region to the merchant, followed by the second delivery region, followed the third delivery region, and then followed by the fourth delivery region.

Using the four delivery regions, the service provider 102 can generate and send the proposals 1004(1)-(4) to the user devices(1)-(4), respectively. For instance, based on the first user device 1002(1) being located in the first, closest delivery region to the merchant, the service provider 102 can generate the first proposal 1004(1) to include options for fulfilling the order by pickup and dine-in, but not by delivery. The service provider 102 may further generate the first proposal 1002(1) such that the costs for pickup and dine-in each respectively include the cost of Items A-E. Additionally, based on the second user device 1002(2) being located in the second closest delivery region to the merchant, the service provider 102 can generate the second proposal 1004(2) to include options for fulfilling the order by pickup and dine-in, but not by delivery. The service provider 102 may further generate the second proposal 1004(2) such that the cost for pickup and dine-in each respectively include the cost of Items A-E minus a first incentive (e.g., $1.00).

Moreover, based on the third user device 1002(3) being located in the third closest delivery region to the merchant, the service provider 102 can generate the third proposal 1004(3) to include options for fulfilling the order by delivery, pickup, and dine-in. The service provider 102 may further generate the third proposal 1004(3) such that the cost for delivery includes the cost of the Items A-E plus the delivery charge (e.g., $2.00) and a first delivery surcharge (e.g., $2.00), and the costs for pickup and dine-in each respectively include the cost of Items A-E minus a second incentive ($2.00). Additionally, based on the fourth user device 1002(4) being located in the fourth, furthest delivery region to the merchant, the service provider 102 can generate the fourth proposal 1004(4) to include options for fulfilling the order by delivery, pickup, and dine-in. The service provider 102 may further generate the fourth proposal 1004(4) such that the cost for the delivery includes the cost of the Items A-E plus the delivery charge ($2.00) and a second delivery surcharge (e.g., $3.00), and the costs for pickup and dine-in each respectively include the cost of Items A-E minus a third incentive (e.g., $3.00).

In some instances, the example of FIG. 10 may correspond to a situation in which there is a shortage of couriers. For instance, the service provider 102 may use the various fulfillment options and/or incentives in order to incentivize users to select either pickup or dine-in. When more users select the pickup or dine-in options, the service provider 102 is required to fulfill less orders by delivery. As such, after a prior of time, the state of the couriers may transition to a new state that indicates that there is no longer a shortage of couriers.

Figure 11:
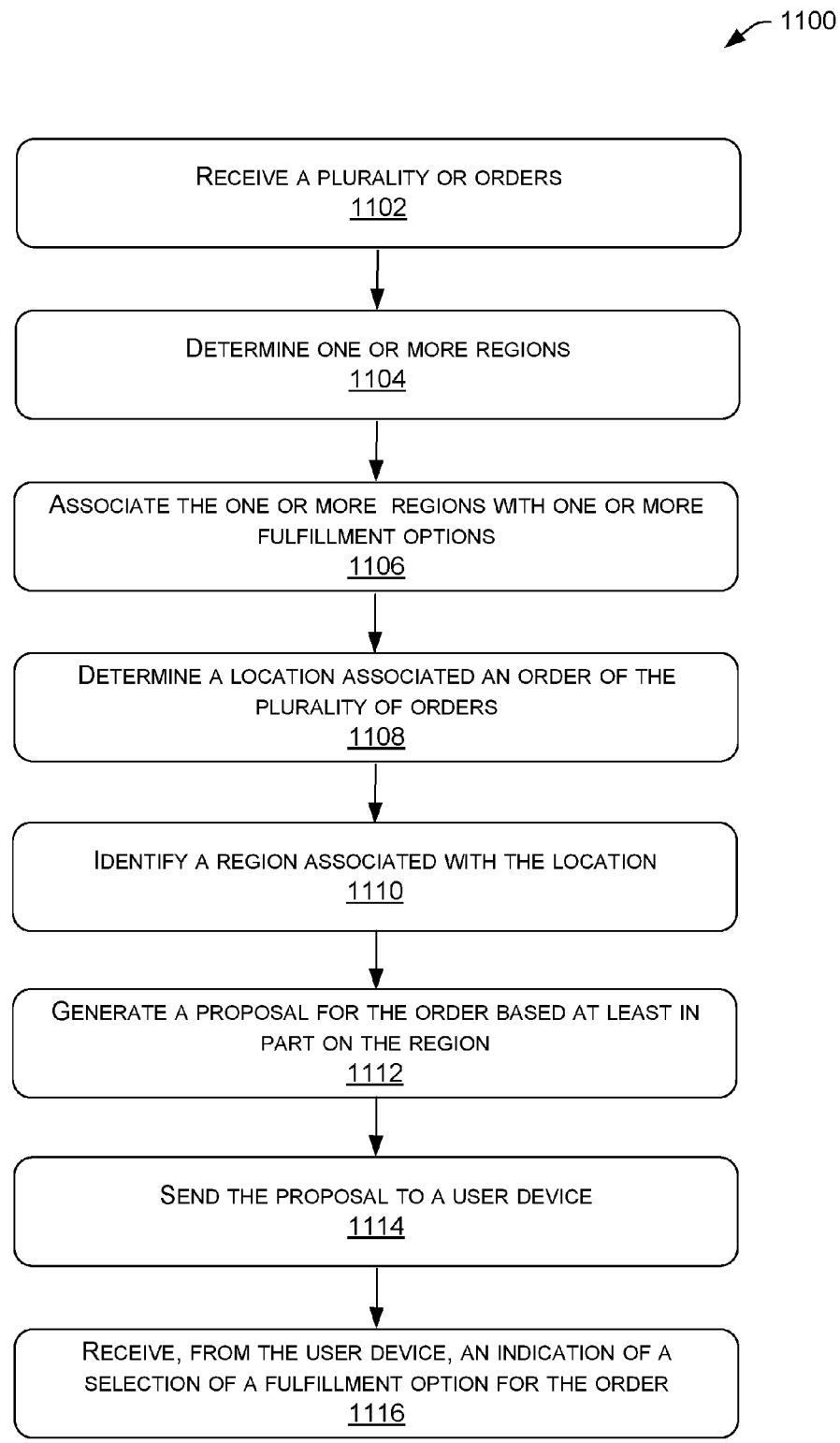
FIG. 11 illustrates an example process for providing options based on delivery regions.

FIG. 11 illustrates an example process 1100 for providing options based on delivery regions. At 1102, the service provider 102 receives a plurality of orders. For instance, the service provider 102 can receive a plurality of orders from a plurality of user devices, where each order of the plurality of orders is for an item (e.g., a menu item) to be prepared by a respective merchant. In some instances, the plurality of orders may be finalized such that the checkout process for respective orders is complete. In some instances, the plurality of orders may include one or more potential orders, where a potential order can include a request for a delivery of an item, but the checkout process has not yet to be complete.

At 1104, the service provider 102 determines one or more regions. For instance, the service provider 102 can determine one or more delivery regions based on a state of the couriers. For example, the service provider 102 may determine one or more delivery regions based on the state of the couriers indicating that there is not a shortage of couriers. For another example, the service provider may determine one or more similar, or different, delivery regions based on the state of the couriers indicating that there is a shortage of couriers. The service provider can then use the one or more delivery regions to determine which fulfillment options to integrate within applications, and/or to determine which incentives to include with each fulfillment option.

For instance, at 1106, the service provider 102 associates the one or more regions with one or more fulfillment options. For instance, the service provider 102 can associated each of the one or more delivery regions with one or more of a first option for fulfilling orders by customer pickup, a second option for fulfilling orders by courier delivery, and a third option for fulfilling orders by dine-in. In some instances, the service provider 102 associates the one or more regions with the one or more fulfillment options based on the state of couriers and/or a shortage level associated with the couriers.

At 1108, the service provider 102 determines a location associated with an order of the plurality of orders. For instance, the service provider 102 may receive a request for an item from a user device. In addition to the request, the service provider 102 can receive location information associated with the order from the user device. In some instances, the location information can indicate a current geographical location of the user device. In some instances, the location information can indicate a future geographical location of the user device. For instance, the user may input a location for fulfilling a delivery of the item into the user device and in response, the user device can send location information indicating the location to the service provider 102.

At 1110, the service provider 102 identifies a region associated with the location. For instance, the service provider 102 can compare the location of the user device with the one or more delivery regions. Based on the comparison, the service provider 102 can identify a delivery region that includes the location associated with the delivery. In some instances, the service provider 102 can utilize one or more algorithms to perform the comparison.

At 1112, the service provider 102 generates a proposal for the order based at least in part on the region. For instance, the service provider can determine which fulfillment options to integrate into the proposal based on the delivery region, where each fulfillment option is associated with fulfilling the order by a respective approach. In some instances, the approaches can include delivery by a courier, pickup by a user, or dine-in by the user. In some instances, the service provider 102 can further determine whether to provide one or more incentives within the proposal based on the delivery region.

At 1114, the service provider 102 sends the proposal to a user device and at 1114, the service provider 102 receives, from the user device, an indication of a selection of a fulfillment option for the order. For instance, the service provider 102 can send the proposal to the user device via an application executing on the user device. The user device can receive the proposal from the service provider 102 and display the proposal using a user interface. While displaying the proposal, the user device can receive input indicating a selection a fulfillment option from the one or more fulfillment options. The user device can then send an indication of the selection to the service provider 102.

Figure 12:
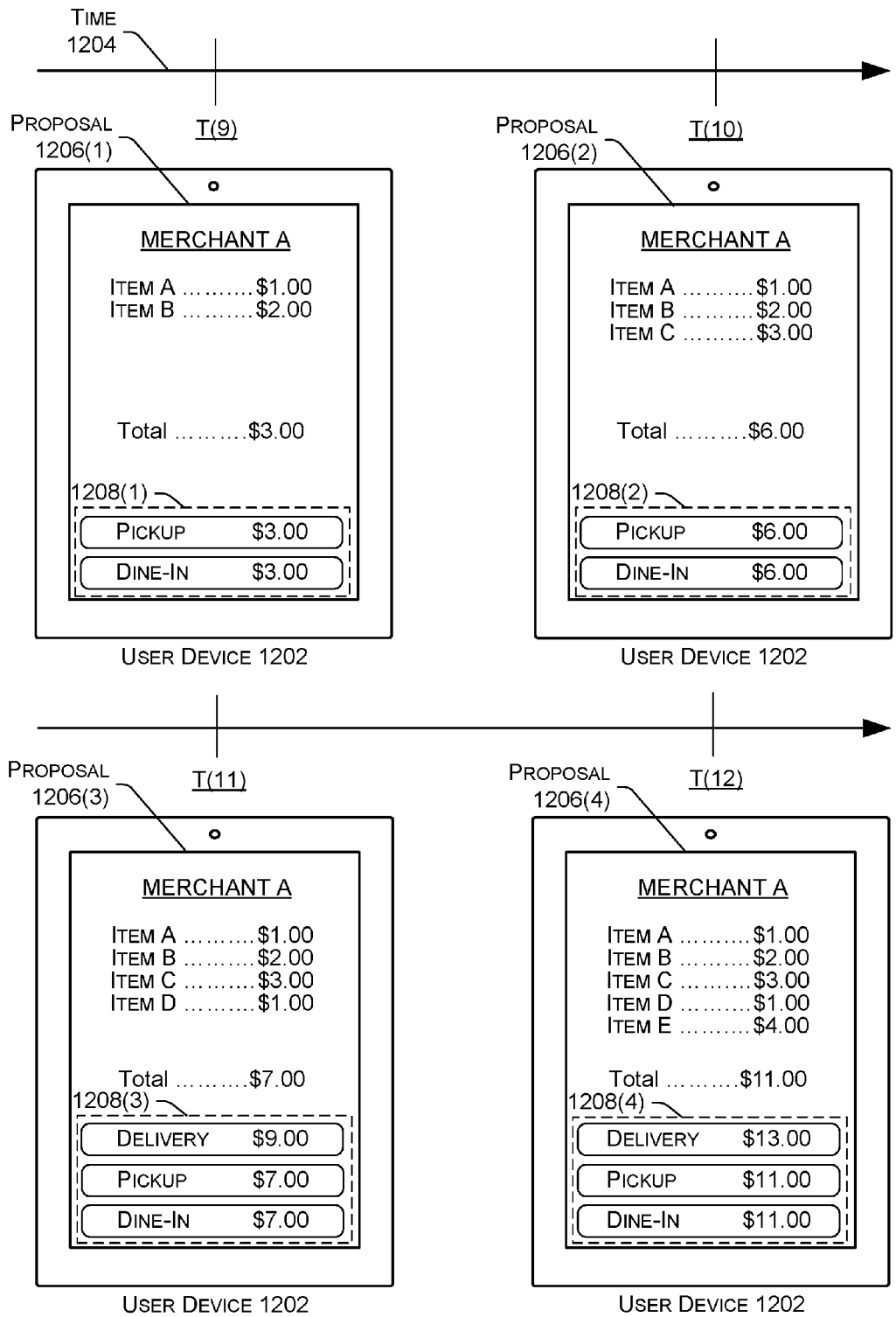
FIG. 12 illustrates an example of providing options for fulfilling orders based on items in a request.

FIG. 12 illustrates an example of providing options for fulfilling orders based on items in a request. In the example of FIG. 12, a user device 1202, which may represent a user device 400, sends requests for items from Merchant A over a given period of time 1204 to the service provider 102. In some instances, the user device 1202 may send a request each time the user adds one of Items A-E to an electronic cart associated with an order that is being prepared by a user using the user device 1202.

For instance, at time T(9), the user device 1202 may send a request for Items A-B to the service provider 102 and, in response, receive a first proposal 1206(1) from the service provider 102. The first proposal 1206(1) includes two options 1208(1) for fulfilling the order of Items A-B, which include pickup for $3.00, and dine-in for $3.00. At time T(10), the user device 1202 may send a request for Items A-C to the service provider 102 and, in response, receive a second proposal 1206(2) from the service provider 102. The proposal 1206(2) also includes two options 1208(2) for fulfilling the order of Items A-C, which include pickup for $6.00 and dine-in for $6.00.

At time T(11), the user device 1202 may send a request for Items A-D to the service provider 102 and, in response, receive a third proposal 1206(3) from the service provider 102. The third proposal 1206(3) includes three options 1208(3) for fulfilling the order of Items A-D, which include delivery for $9.00 (e.g., the cost of Items A-D plus a delivery charge of $2.00), pickup for $7.00, and dine-in for $7.00. Finally, at time T(12), the user device 1202 may send a request for Items A-E to the service provider 102 and, in response, receive a fourth proposal 506(4) from the service provider 102. The fourth proposal 1206(4) includes three options 1208(4) for fulfilling the order of Items A-E, which include delivery for $13.00 (e.g., the cost of Items A-E plus a delivery charge of $2.00), pickup for $11.00, and dine-in for $11.00.

In some instances, the service provider 102 may set a threshold price and/or a threshold number of items that a request must include in order for a proposal to include the option of fulfillment by delivery. For example, in the example of FIG. 12, the service provider 102 may set the threshold cost at a minimum of $7.00. As such, based on receiving the request for Items A-D from the user device 1202, which is the first request to reach the $7.00 minimum, the service provider 102 generates and sends the third proposal 1206(3) that includes the option to fulfill the order by delivery. For another example, and using the example of FIG. 12, the service provider 102 may set the threshold number items at a minimum of four items. As such, based on receiving the request for Items A-D from the user device 1202, which is the first request to reach the four item minimum, the service provider 102 generates and sends the third proposal 1206(3) that includes the option to fulfill the order by delivery.

Figure 13:
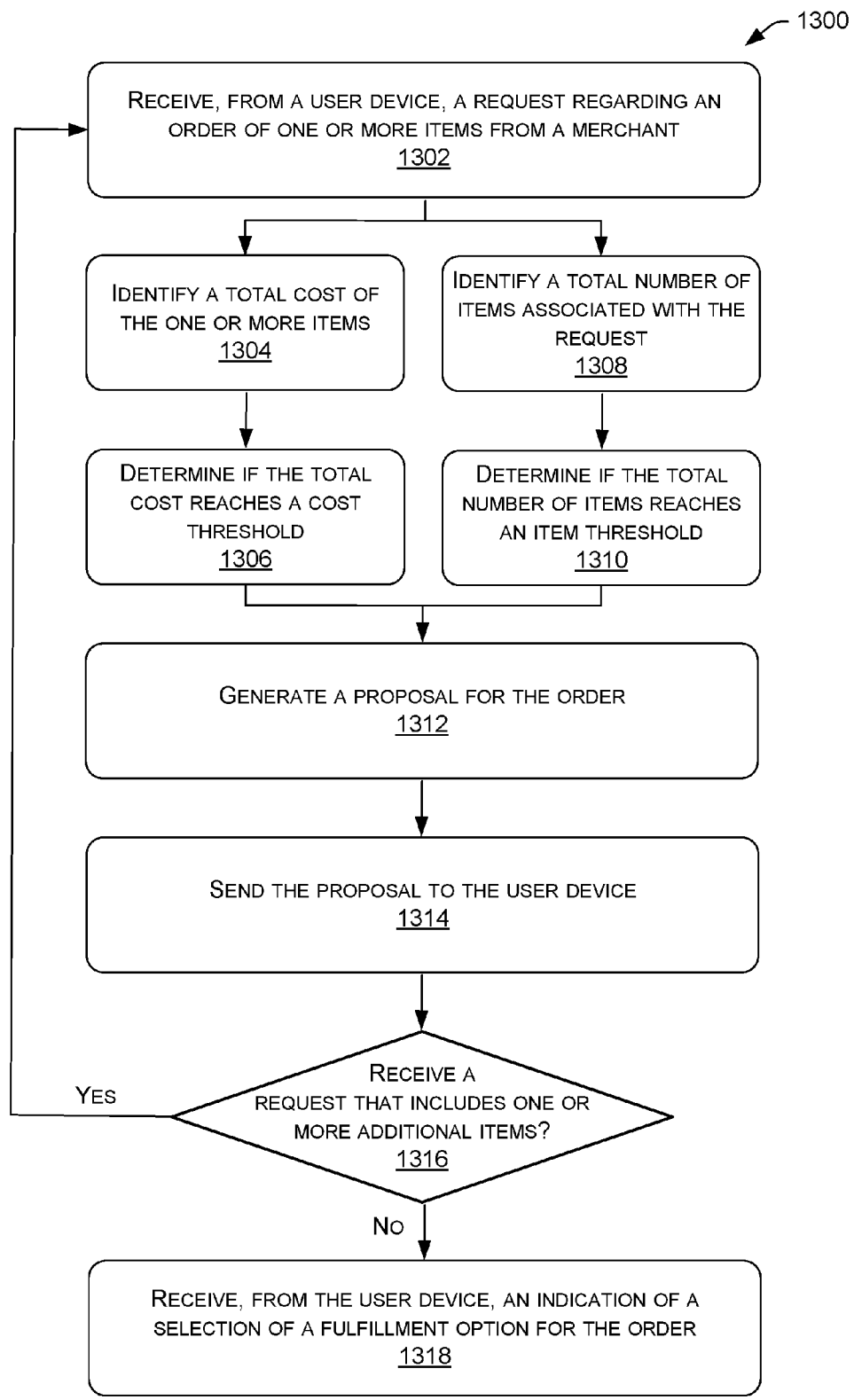
FIG. 13 illustrates an example process for providing options for fulfilling orders based on items in a request.

FIG. 13 illustrates an example process 1300 for providing options for fulfilling orders based on items in a request. At 1302, the service provider 102 receives, from a user device, a request regarding an order of one or more items from a merchant. For instance, the service provider 102 may receive, from a user device, requests for items as a user utilizes a user interface provided by the user device to add items to an electronic cart. In some instances, the user device sends a request each time the user causes one or more items to be added to the electronic cart. In some instances, the user device sends a request at given time intervals, such as every minute, five minutes, or the like. Still, in some instances, the user device sends a request when a user selects a control provided by the user interface. For instance, the user device may send a request when the user selects a checkout button provided by the user interface.

At 1304, the service provider 102 identifies a total cost of the one or more items and at 1306, the service provider 102 determines if the total cost reaches a cost threshold. For instance, the service provider 102 may use one or more algorithms to calculate a total cost of the one or more items (e.g., the one or more items within the electronic cart). In some instances, the service provider 102 calculates the total cost using a given tax rate. The service provider 102 may then use one or more algorithms to compare the total cost to a cost threshold in order to determine whether the total cost reaches (e.g., is equal to or greater than) the cost threshold. In some instances, the cost threshold can include any monetary amount, such as $1.00, $5.00, $10.00, or the like.

Additionally to, or alternatively from 1304 and 1306, at 1308, the service provider 102 identifies a total number of items associated with the request and at 1310, the service provider 102 determines if the total number of items reaches an item threshold. For instance, the service provider 102 may use one or more algorithms to calculate a total number of items that are included in the request (e.g., total number of items included in the electronic cart). The service provider 102 may then use one or more algorithms to compare the total number of items to an item threshold in order to determine whether the total number of items reaches (e.g., is equal to or greater than) the item threshold. In some instances, the item threshold can include any number of items, such as 1 item, 5 items, 10 items, or the like.

At 1312, the service provider 102 generates a proposal for the order and at 1314, the service provider 102 sends the proposal to the user device. For instance, the service provider 102 can generate a proposal for the order that includes one or more fulfillment options integrated into the proposal. In some instances, the one or more fulfillment options are based on whether the total cost reaches the cost threshold and/or whether the total number of items reaches the item threshold. For example, the service provider 102 may generate the proposal to include options for pickup and dine-in, but not an option for delivery, based on the total cost not reaching the cost threshold and/or the total number of items not reaching the item threshold. For another example, the service provider 102 may generate the proposal to include options for delivery, pickup, and dine-in based on the total cost reaching the cost threshold and/or the total number of items reaching the item threshold. The service provider 102 can then send the proposal to the user device.

At 1316, the service provider 102 determines whether another request is received, from the user device, that includes one or more additional items. For instance, the user may use the user interface to add one or more additional items into the electronic cart and in response, the user device may send an additional request that includes the one or more additional items. If, at 1316, the service provider 102 receives an additional request, the process 1300 begins back at step 1302 using all of the items included in the additional request (e.g., the original one or more items as well as the one or more additional items).

However, if, at 1316, the service provider 102 does not receive another request, then at 1318, the service provider 102 receives, from the user device, an indication of a selection of a fulfillment option for the order. For instance, the user device can receive the proposal from the service provider 102 and display the proposal using the user interface. While displaying the proposal, the user device can receive input indicating a selection a fulfillment option from the one or more fulfillment options. The user device can then send an indication of the selection to the service provider 102.

Figure 14:
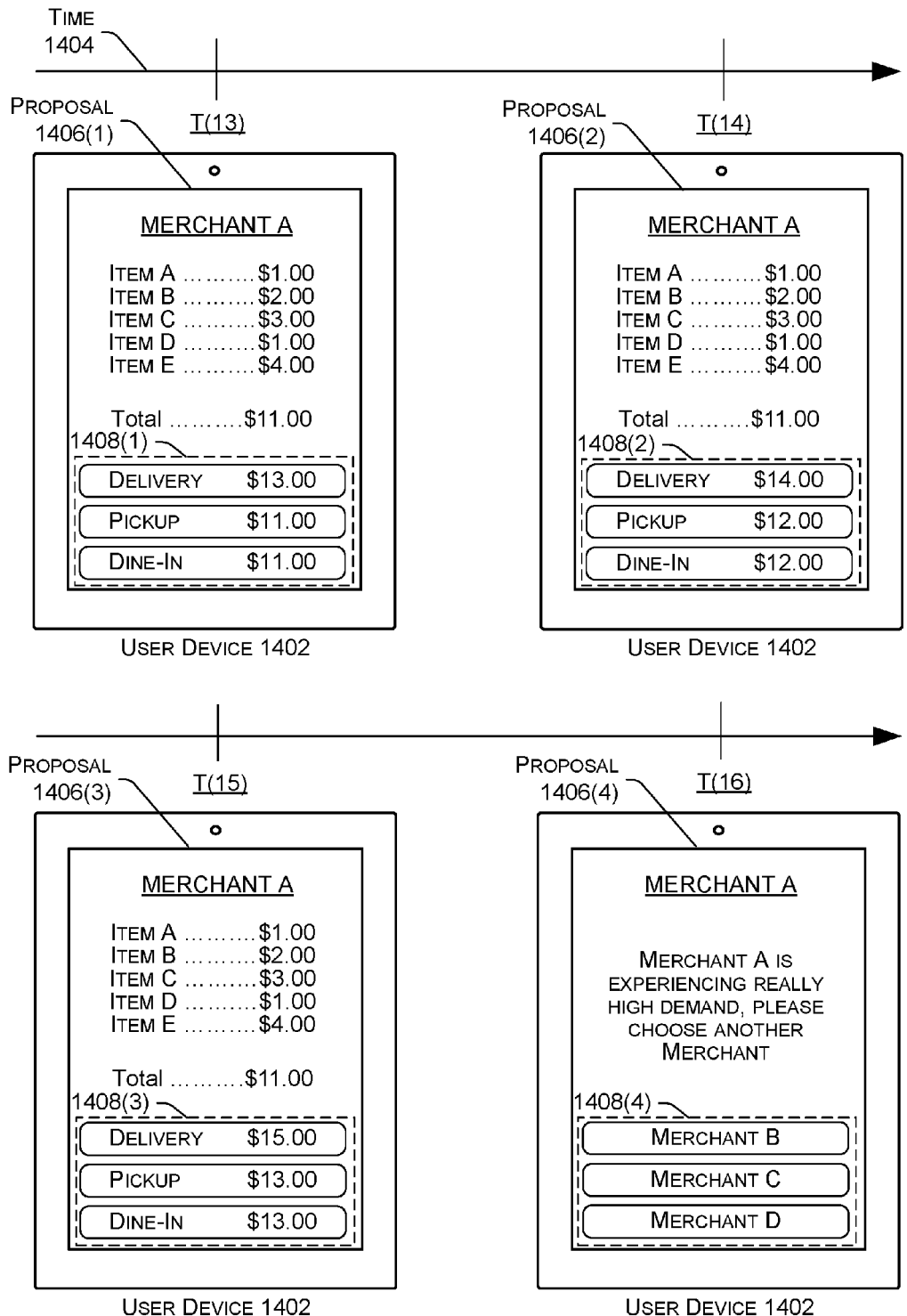
FIG. 14 illustrates an example of providing options for fulfilling orders based on merchant restraints.

FIG. 14 illustrates an example of providing options for fulfilling orders based on merchant restraints. In the example of FIG. 14, a user device 1402, which may represent a user device 400, sends requests for Items A-E from Merchant A over a given period of time 1404 to the service provider 102.

For instance, at time T(13), the user device 1402 may send a request for Items A-E to the service provider 102 and, in response, receive a first proposal 1406(1) from the service provider 102. The first proposal 1406(1) includes three options 1408(1) for fulfilling the order of Items A-E, which include delivery for $13.00 (e.g., the cost of Items A-E plus a delivery charge of $2.00), pickup for $11.00, and dine-in for $11.00. At time T(14), the user device 1402 may again send a request for Items A-E to the service provider 102 and, in response, receive a second proposal 1406(2) from the service provider 102. The second proposal 1406(2) also includes three options 1408(2) for fulfilling the order of Items A-E, which include delivery for $14.00 (e.g., the cost of Items A-E, plus the delivery charge of $2.00 and a first delivery surcharge of $1.00), pickup for $12.00 (e.g., the cost of items A-E plus a first surcharge cost of $1.00), and dine-in for $12.00 (e.g., the cost of Items A-E plus the first surcharge cost of $1.00).

At time T(15), the user device 1402 may send a request for Items A-E to the service provider 102 and, in response, receive a third proposal 1406(3) from the service provider 102. The third proposal 1406(3) also includes three options 1408(3) for fulfilling the order of Items A-E, which include delivery for $15.00 (e.g., the cost of Items A-E, plus the delivery charge of $2.00 and a second delivery surcharge of $2.00), pickup for $13.00 (e.g., the cost of items A-E plus a second surcharge cost of $2.00), and dine-in for $13.00 (e.g., the cost of items A-E plus the second surcharge cost of $2.00). Finally, at time T(16), the user device 1402 may send a request for Items A-E to the service provider 102 and, in response, receive a fourth proposal 1406(4) from the service provider 102. The fourth proposal 1406(4) includes options 1408(4) for three additional merchants, Merchant B, Merchant C, and Merchant D.

In some instances, the service provider 102 can generate the proposals 1406(1)-(4) based on one or more restraints of Merchant A. The one or more restraints can include a number of order(s) that Merchant A is in the process of preparing (e.g., how busy Merchant A, such as indicated by the status bar 120), a number of potential order(s) that Merchant A may process in the future (e.g., how many user(s) are using respective user device(s) to search for item(s) provided by Merchant A and/or are adding item(s) from Merchant A in a respective electronic cart), reservation(s) associated with Merchant A (e.g., reserved time(s) for dine-in service by user(s), order(s) that are to be prepared by Merchant A at a future time), estimated time(s)

for preparing current, potential, and/or future order(s), a number of order(s) that Merchant A capable of processing, and/or the like.

For example, at time T(13), the service provider 102 may determine that Merchant A is operating in a normal mode. In some instances, the service provider 102 can determine that Merchant A is operating in the normal mode based on Merchant A using the status bar 120 (from FIG. 1) to indicate that Merchant A is operating in the normal mode. In some instances, the service provider 102 can determine that Merchant A is operating the in normal mode based on a number of orders that Merchant A is in the process of preparing and/or one or more estimated times for preparing the number of orders.

Based on determining that Merchant A is operating in the normal mode, the service provider 102 can generate the first proposal 1406(1) that includes options to fulfill the order by delivery, pickup, and dine-in. Additionally, the service provider 102 can determine that a cost associated with delivery includes the cost of Items A-E plus the normal delivery charge (e.g., $2.00), the cost associated with pickup includes the cost of Items A-E, and the cost associated with dine-in includes the cost of Items A-E. The service provider 102 can then input the each of the costs into the first proposal 1406(1).

At time T(14), the service provider 102 may determine that Merchant A is operating in a busy mode. In some instances, the service provider 102 can determine that Merchant A is operating in the busy mode based on Merchant A using the status bar 120 (from FIG. 1) to indicate that Merchant A is operating in the busy mode. In some instances, the service provider 102 can determine that Merchant A is operating the in busy mode based on a number of orders that Merchant A is in the process of preparing and/or one or more estimated times for preparing the number of orders.

Based on determining that Merchant A is operating in the busy mode, the service provider 102 can generate the second proposal 1406(2) that includes options to fulfill the order by delivery, pickup, and dine-in. Additionally, the service provider 102 can determine that a cost associated with delivery includes the cost of Items A-E plus the normal delivery charge (e.g., $2.00) and a first delivery surcharge (e.g., $1.00) associated with the busy mode, the cost associated with pickup includes the cost of Items A-E plus the first surcharge cost (e.g., $1.00) associated with the busy mode, and the cost associated with dine-in should include the cost of Items A-E plus the first surcharge cost (e.g., $1.00) associated with the busy mode. The service provider 102 can then input the each of the costs into the second proposal 1406(2).

At time T(15), the service provider 102 may determine that Merchant A is operating in a slammed mode. In some instances, the service provider 102 can determine that Merchant A is operating in the slammed mode based on Merchant A using the status bar 120 (from FIG. 1) to indicate that Merchant A is operating in the slammed mode. In some instances, the service provider 102 can determine that Merchant A is operating the in slammed mode based on a number of orders that Merchant A is in the process of preparing and/or one or more estimated times for preparing the number of orders.

Based on determining that Merchant A is operating in the slammed mode, the service provider 102 can generate the third proposal 1406(3) that includes options to fulfill the order by delivery, pickup, and dine-in. Additionally, the service provider 102 can determine that a cost associated with delivery includes the cost of Items A-E plus the normal delivery charge (e.g., $2.00) and a second delivery surcharge (e.g., $2.00) associated with the slammed mode, the cost associated with pickup includes the cost of Items A-E plus a second surcharge cost (e.g., $2.00) associated with the slammed mode, and the cost associated with dine-in includes the cost of Items A-E plus the second surcharge cost (e.g., $2.00) associated with the slammed mode. The service provider 102 can then input the each of the costs into the third proposal 1406(3).

At time T(16), the service provider 102 may determine that Merchant A is still operating in a slammed mode. In some instances, the service provider 102 can determine that Merchant A is still operating in the slammed mode based on Merchant A using the status bar 120 (from FIG. 1) to indicate that Merchant A is still operating in the slammed mode. In some instances, the service provider 102 can determine that Merchant A is still operating the in slammed mode based on a number of orders that Merchant A is in the process of preparing and/or one or more estimated times for preparing the number of orders.

In some instances, based on determining that Merchant A operates in the slammed mode for a threshold period of time, and/or based on determining that Merchant A continues to get busier even after receiving the indication that Merchant A is operating in the slammed mode, the service provider 102 can generate the fourth proposal 1406(4) that includes options for requesting items from other merchants, such as Merchant B, Merchant C, and Merchant D. In some instances, each of the Merchants B-D may provide similar items (e.g., Items A-E) as the Merchant A. In some instances, one or more of the Merchants B-D may provide different items from the Merchant A.

In some instances, the user can select one of the options for Merchants B-D and the service provider 102 will generate a new proposal for the user that is associated with the selected Merchant B-D. For instance, the service provider 102 can receive an indication that Merchant B was selected. Based on receiving the indication, the service provider 102 can generate a proposal for acquiring Items A-E from Merchant B. In some instances, the proposal can include one or more of the same three options for fulfilling the order, delivery, pickup, dine-in, as well as a cost associated with each of the one or more options.

Figure 15:
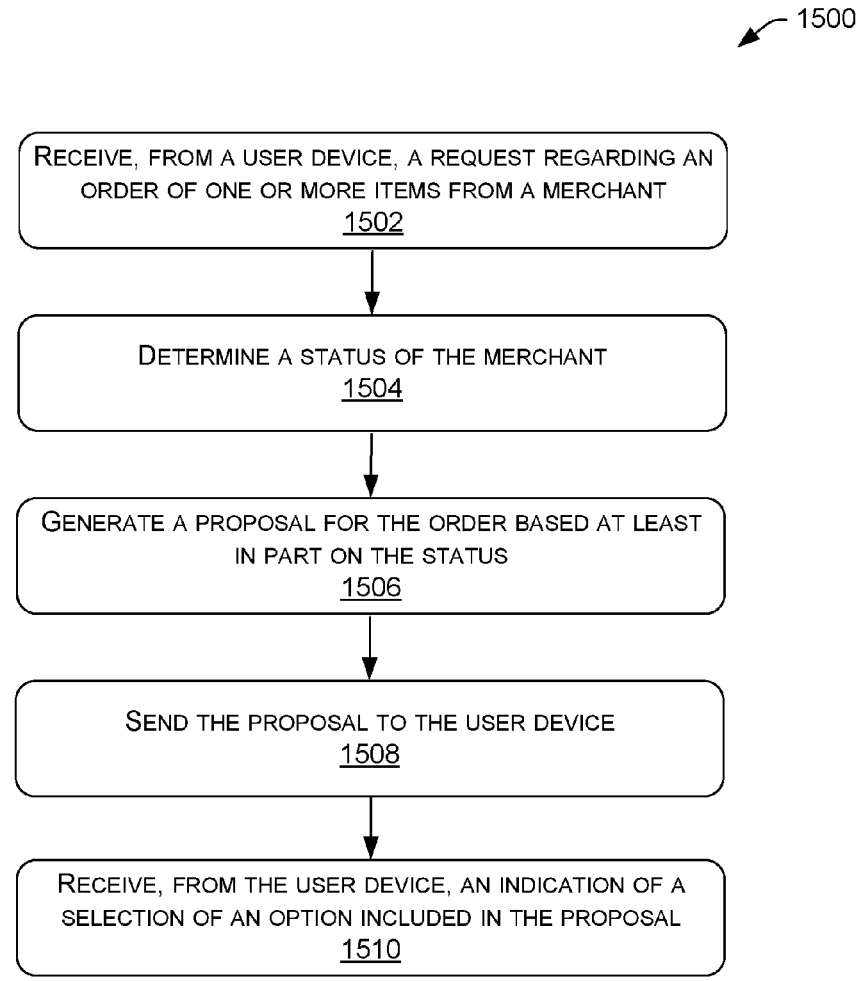
FIG. 15 illustrates an example process for providing options for fulfilling orders based on merchant restraints.

FIG. 15 illustrates an example process 1500 for providing options for fulfilling orders based on merchant restraints. At 1502, the service provider 102 receives, from a user device, a request regarding an order of one or more items from a merchant. For instance, the user may utilize a user interface to add one or more items to an electronic cart associated with the merchant. Based on adding the one or more items to the electronic cart, the user device may send the request to the service provider 102 regarding an order for the one or more items.

At 1504, the service provider 102 determines a status of the merchant. For instance, the service provider 102 can determine a mode in which the merchant is operating. In some instances, the service provider 102 can determine the mode based on the merchant using a status bar to indicate the mode. In some instances, the service provider 102 can determine the mode based on a number of orders that the merchant is in the process of preparing and/or one or more estimated times for preparing the number of orders. In some instances, the mode can include a normal mode, a busy mode, and a slammed mode.

At 1506, the service provider 1526 generates a proposal for the order based at least in part on the status. For instance, the service provider 102 can determine one or more options to integrate into the proposal based on the status. In some instances, the one or more options can include fulfillment options (e.g., delivery, pickup, dine-in). Additionally, or alternatively, in some instances, the one or more options can include options to place an order through one or more other merchants. For instance, each of the one or more options can be associated with a respective merchant that also provides the one or more items.

In some instances, the service provider 102 can further determine one or more respective costs associated with each of the one or more options. In some instances, when determining the one or more respective costs, the service provider 102 can determine whether to add a surcharge cost based on the status of the merchant. For instance, the service provider 102 can determine to add a surcharge cost based on the merchant operating in the busy mode or the slammed mode.

At 1508, the service provider 102 sends the proposal to the user device and at 1510, the service provider 102 receives, from the user device, an indication of a selection of an option included in the proposal. For instance, the service provider 102 can send the proposal to the user device via an application executing on the user device. The user device can receive the proposal from the service provider 102 and display the proposal using a user interface. While displaying the proposal, the user device can receive input indicating a selection an option from the one or more options. The user device can then send an indication of the selection to the service provider 102.

FIG. 16 illustrates an example sequence diagram 1600 of the techniques in the context of initiating an order at a user device. The example sequence diagram 1600 illustrates various operations that are performed in an example order by the user device 400, the merchant device 200, the service provider 102, and/or the courier device 300. Such operations are illustrated as an example and may be performed in other orders, at other times, and/or by other devices. In some instances, operations that are described as being performed by the merchant device 200 and/or the user device 400 may be performed (at least in part) by another service provider.

At 1602, the user device 400 may receive user input from a user regarding interest in an item. For example, the user may interact with an item acquisition interface to place an item in an electronic shopping cart for purchase. The user may indicate an interest in having the item delivered.

At 1604, the user device 400 may generate and/or send a delivery proposal request to the service provider 102. The delivery proposal request may be sent via one or more APIs associated with the service provider 102. In some instances, the user may specify the information included in the delivery proposal request, while in other instances information may otherwise be specified or determined.

At 1606, the courier device 300 may determine a location of the courier device 300 and/or send location information indicating the location of the courier device 300 to the service provider 102. Such location information may be sent at any time. For example, the location information may be sent as a location changes, periodically, and/or at other times. As such, multiple pieces of location information may be sent over time.

At 1608, the service provider 102 may generate a delivery proposal. The delivery proposal may be based on various information as discussed herein, such as information included in the delivery proposal request, information about courier(s) (e.g., state of the courier(s)), information about a merchant (e.g., state of the merchant), information about a user, and so on. In some instances, the delivery proposal can include one or more fulfillment options, such as delivery, pickup, or dine-in At 1610, the service provider 102 may send the delivery proposal to the user device 400.

In the example sequence diagram 1600, the user may accept the delivery proposal at 1612 and send a delivery proposal acceptance to the service provider 102 via the one or more APIs associated with the service provider 102 at 1614. In some instances, one or more criteria may be established for acceptance/rejection of a delivery proposal, so that the delivery proposal is automatically accepted/rejected upon satisfying the one or more criteria. In some instances, the delivery proposal acceptance includes in indication of a selected fulfillment option, such as delivery, pickup, or dine-in.

Upon receiving the delivery proposal acceptance, the service provider 102 may send an order request to the merchant device 200 at 1616. The order request may request if the merchant is able to fulfill the order that is placed by the user. In some instances, the order request may include any information in the delivery proposal. For instance, the order request may include information indicating whether the order will be fulfilled by a courier, such as in the case of a delivery, or by the user, such as in the case of a pickup or a dine-in. In the example sequence diagram 1600, the merchant device 200 sends an order acceptance at 1620 indicating that the merchant is able to fulfill the order that is placed by the user.

At 1622, the service provider 102 may select a courier to deliver the item to the user. The courier selection may be based on various information, such as information included in a request for a delivery proposal, information in a delivery proposal, information about a courier (e.g., location information, courier profile information, etc.), information about a merchant (e.g., location information, merchant profile information, etc.), information about a user (e.g., location information, a user profile, etc.), and so on.

At 1624, the service provider 102 may communicate with the courier device 300 to request that the courier device 300 delivery the item to the user. The service provider 102 may communicate with any number of courier devices until a courier device sends an acceptance indicating that the courier device is available to deliver the item.

At 1626, the service provider 102 may send a delivery acceptance to the merchant device 200 indicating that the courier device 300 has accepted delivery. In some instances, the delivery acceptance may indicate a current status of the courier, such as a current location of the courier, etc. Further, in some instances the delivery acceptance may include any information in the delivery proposal.

At 1628, the merchant device 200 may present information to the merchant regarding the order. For example, the merchant device 200 may display a status of progress of preparing the item by the merchant, information included in the delivery proposal, information included in the delivery acceptance, and so on.

At 1630, the courier device 300 may determine and/or send location information indicating a location of the courier device 300. In some instances, the courier device 300 may send other information, such as a confirmation that an item has been picked-up at the merchant's location. Such location information and/or other information may be sent at any time.

At 1632, the service provider 102 may send a delivery update to the merchant device 200 (e.g., a status of delivery of the item). The delivery update may be based on information received by the courier device 300 at 1630. The delivery update may indicate a status of delivery of item, such as a location of the courier device 300, an indication of the item being picked-up or dropped-off, etc. At 1634, the service provider 102 may also provide the delivery update to the user device 400. At 1636, the merchant device 200 may present information in the delivery update to the merchant. At 1638, the user device 400 may present the information in the delivery update to the user.

Although the example sequence diagram 1600 illustrates the delivery proposal being generated by the service provider 102 at 1608 and sent to the user device 400 at 1610, the service provider 102 may generate and/or send proposals that include the one or more fulfillment options at various times during an initiating of an order. For instance, the service provider 102 may generate a proposal that includes one or more fulfillment options any time between receiving the delivery proposal request at 1604 and receiving the order acceptance at 1620. For instance, the service provider can generate and send proposal(s) between a time in which a user inputs item(s) into an electronic card, and a time in which the user checks the item(s) out that are in the electronic cart. Additionally, the service provider 102 may generate and send a proposal to the user device 400 that includes one or more fulfillment options after receiving the order acceptance at 1620. For instance, after receiving the order acceptance at 1620, the service provider 102 may determine that a status of the couriers has changes (e.g., from indicating no shortage of couriers to shortage of couriers). Based on the change in the status, the service provider 102 can generate and send the user device 400 a proposal that includes one or more fulfillment options for the order.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
a service computing device including a service computing device processor and a service computing device communication interface communicatively coupled to the service computing device processor, the service computing device communication interface for communicating over one or more networks with a plurality of courier devices, a plurality of merchant devices, and a plurality of customer devices, the service computing device being configured to:
receive, by the service computing device, from a plurality of first customer devices of the plurality of customer devices, a plurality of orders, respectively, each respective order of the plurality of orders being for a respective menu item to be prepared by a respective merchant for a respective first customer associated with a respective first customer device of the plurality of customer devices:
receive, by the service computing device, from each respective first customer device of the plurality of customer devices, first information indicating a geographic location of the respective first customer device;
receive, by the service computing device, from each respective courier device of the plurality of courier devices, second information indicating a geographic location of the respective courier device, wherein a courier application executable on each respective courier device determines and sends the second information to the service computing device;
determine, by the service computing device, a courier shortage state based at least in part on the received plurality of orders, the received geographic locations of the plurality of first customer devices, and the received geographic locations of the plurality of courier devices;
receive, by the service computing device, from a customer application executing on a second customer device of the plurality of customer devices, an indication that a second customer has accessed the customer application on the second customer device, the customer application including functionality for ordering the respective menu items from the respective merchants;
generate, by the service computing device, based at least in part on the courier shortage state and the indication that the second customer has accessed the customer application on the second customer device, fulfillment information for presentation on the second customer device;
send, by the service computing device, the fulfillment information to the second customer device, wherein the customer application is executable by one or more processors of the second customer device to:
send the first information to the service computing device indicating the geographic location of the second customer device;
present an interface on a display associated with the second customer device;
receive, from the service computing device, the fulfillment information, the fulfillment information causing the customer application to present, in the interface, one or more acquisition options for acquiring a menu item, by at least one of:
restricting from presentation in the interface a first acquisition option for acquiring the menu item by delivery; or
displaying in the interface an incentive for acquiring the menu item using a second acquisition option that is different from the first acquisition option;
receive, via the interface, a customer selection of a presented acquisition option for the menu item; and
send order information to the service computing device based on the customer selection.

2. The system as claim 1 recites, wherein:
the service computing device is further configured to:
receive, from an additional plurality of customer devices, an indication of a plurality of potential orders, wherein a respective potential order of the plurality of potential orders is for a respective menu item to be prepared by the merchant for a respective potential customer, wherein determining the courier shortage state is further based at least in part on the indication of the plurality of potential orders; and
each respective additional customer device of the additional plurality of customer devices comprises a respective customer application executable by one or more processors of the respective additional customer device associated with the respective potential customer to:
provide an interface to the respective potential customer via a display associated with the respective additional customer device;

receive, via the interface, a selection of the respective menu item as the respective potential order; and send the respective potential order to the service computing device.

3. The system as claim 1 recites, wherein the service computing device is further configured to:

generate with the fulfillment information a proposal based, at least in part, on the courier shortage state, the proposal including the first acquisition option associated with a first cost for fulfilling the order by delivery by a courier, and the second acquisition option associated with a second cost for fulfilling the order by pickup or dine-in by the second customer, wherein the second cost is different from the first cost.

4. The system as claim 1 recites, wherein the service computing device is further configured to:

generate the fulfillment information to include the second acquisition option for acquiring the menu item by pickup or dine-in by the second customer without including the first acquisition option for acquiring the menu item by delivery by a courier.

5. A method comprising:

receiving, by one or more processors, a plurality of first orders from a plurality of first electronic devices;

assigning, by the one or more processors, individual ones of the plurality of first orders for fulfillment by delivery to respective couriers of a plurality of first couriers;

receiving, by the one or more processors, from each of a plurality of first courier devices associated with the plurality of first couriers, first information indicating a first geographic location of the respective first courier device;

receiving, by the one or more processors, from a customer application executing on a second electronic device, an indication that a customer has accessed the customer application on the second customer device, the customer application including functionality enabling ordering an item from a merchant;

receiving, by the one or more processors, from a second courier device associated with a second courier, second information indicating a second geographic location of the second courier device;

determining, by the one or more processors, a courier shortage state based at least in part on the first geographic locations of the plurality of first courier devices and the second geographic location of the second courier device;

generating, by the one or more processors, based at least partially on the courier shortage state and the indication that the customer application has been accessed on the second electronic device, fulfillment information for presentation on the second electronic device;

sending, by the one or more processors, to the second electronic device, the fulfillment information, the fulfillment information causing the customer application on the second electronic device to at least one of:

restrict, from display in a user interface presented on the second electronic device, a first acquisition option for acquiring the item by delivery; or display, in the user interface, an incentive for acquiring the item using a second acquisition option that is different from the first acquisition option;

receiving, by the one or more processors, from the second electronic device, an indication of a selected acquisition option for a second order for acquiring the item; and sending, by the one or more processors, a communication for fulfilling the second order according to the selected acquisition option.

6. The method as claim 5 recites, further comprising:

receiving, from the second electronic device, third information indicating a third geographic location of the second electronic device, and wherein determining the courier shortage state is further based, at least in part, on the third geographic location.

7. The method as claim 5 recites, further comprising:

determining, based at least in part on the plurality of first orders, a number of delivery orders that are in process of being fulfilled by delivery;

determining, based at least in part on the first information, a number of couriers that are available to fulfill delivery of the plurality of first orders; and determining the courier shortage state, based at least in part, on the number of delivery orders and the number of couriers.

8. The method as claim 5 recites, further comprising:

determining, based at least in part on the plurality of first orders, a threshold distance from respective merchants in which orders can be fulfilled by delivery;

receiving, from the second electronic device, third information indicating a third geographic location of the second electronic device; and determining that the third geographic location is within the threshold distance from the merchant, and wherein, based at least in part on the third geographic location being within the threshold distance, the second acquisition option includes pickup or dine-in by the customer and the first acquisition option includes delivery by the second courier.

9. The method as claim 5 recites, further comprising:

determining, based at least in part on the plurality of first orders, a threshold distance from respective merchants in which orders can be fulfilled by delivery;

receiving, from the second electronic device, third information indicating a third geographic location of the second electronic device; and determining that the third geographic location is outside the threshold distance from the merchant, and wherein, based at least in part on the third geographic location being outside of the threshold distance, the second acquisition option includes pickup or dine-in by the customer and the first acquisition option is restricted from being presented.

10. The method as claim 5 recites, further comprising:

receiving from a third electronic device, an indication that a customer application on the third electronic device has been accessed, the indication including a request regarding a third order of an item;

generating, based at least in part on the first geographic locations of the plurality of first courier devices and the second geographic location of the second courier device, additional fulfillment information to send to the third electronic device, the additional fulfillment information including the second acquisition option including at least one of pickup or dine-in by a customer associated with the third electronic device, without including the first acquisition option associated with fulfilling the third order by delivery; and sending, to the third electronic device, the additional fulfillment information for fulfilling the third order.

11. The method as claim 5 recites, further comprising:
determining, based at least in part on the plurality of first orders, a first cost associated with fulfilling the second order by delivery by courier; and
determining, based at least in part on the plurality of first orders, a second cost associated with fulfilling the second order by at least one of customer pick up or dine-in,
and wherein generating the fulfillment information comprises generating the fulfillment information to further cause the customer application on the second electronic device to present an indication of the first cost and an indication of the second cost.

12. The method as claim 5 recites, further comprising:
receiving, at a first period of time, a first indication that the item has been added to an electronic cart associated with the second order; and
receiving, at a second period of time, a second indication that a checkout process associated with the electronic cart is complete,
and wherein generating the fulfillment information further comprises at least one of:
generating the fulfillment information between the first period of time and the second period of time; or
generating the fulfillment information after the second period of time.

13. The method as claim 5 recites, wherein fulfilling the second order comprises fulfilling the second order by delivery by the second courier, and wherein the method further comprises:
sending, to the second courier device associated with the second courier, first instructions for fulfilling the second order;
receiving, from a third electronic device, a third order for an additional item from an additional merchant;
determining that the second courier should fulfill the third order by delivery;
sending, to the second courier device, second instructions for fulfilling the third order;
identifying a third courier to fulfill the second order; and
sending, to a third courier device associated with the third courier, the first instructions for fulfilling the second order.

14. A system comprising:
one or more processors; and
one or more computer-readable media storing instructions that, when executed by the one or more processors, cause the one or more processors to perform operations comprising:
receiving, by the one or more processors, a plurality of orders to be fulfilled by delivery by a plurality of couriers associated with a plurality of respective courier devices;
receiving, by the one or more processors, from the respective courier devices, location information indicating respective geographic locations associated with the respective courier devices;
determining, by the one or more processors, a courier shortage state based, at least in part, on the plurality of orders and the respective geographic locations associated with the respective courier devices;
receiving, by the one or more processors, from a customer application executing on an electronic device, an indication that a customer has accessed the customer application on the electronic device, the customer application including functionality for ordering an item from a merchant;
generating, by the one or more processors, based at least in part on the courier shortage state and the indication that the customer application has been accessed on the second customer device, fulfillment information for presentation on the electronic device; and
sending, by the one or more processors, the fulfillment information to the electronic device to cause the customer application on the electronic device to at least one of:
restrict, from display in a user interface presented on the electronic device, a first acquisition option for acquiring the item by delivery; or
display, in the user interface, an incentive for acquiring the item by a second acquisition option that is different from the first acquisition option.

15. The system as claim 14 recites, the operations further comprising:
determining, based at least in part on the plurality of orders, a number of orders that are in process of being fulfilled by delivery; and
determining, based at least in part on the respective geographic locations associated with the respective courier devices, a number of couriers that are available for fulfilling the number of orders,
and wherein determining the courier shortage state comprises determining the courier shortage state based, at least in part, on the number of orders and the number of couriers.

16. The system as claim 14 recites, the operations further comprising:
receiving, from the electronic device, additional location information indicating a geographic location associated with the electronic device,
and wherein generating the fulfillment information is further based, at least in part, on the geographic location associated with the electronic device.

17. The system as claim 14 recites, wherein the location information includes first location information and the respective geographic location includes a first respective geographic location, and wherein the operations further comprise:
determining, based at least in part on the courier shortage state, a threshold distance from respective merchants in which orders can be fulfilled by delivery;
receiving, from the electronic device, second information indicating a second geographic location associated with the electronic device; and
determining that the second geographic location is outside of the threshold distance from the merchant,
and wherein, based at least in part on the second geographic location being outside of the threshold distance from the merchant, the fulfillment information causes the customer application on the electronic device to restrict, from display in the user interface, the first acquisition option for acquiring the item by delivery.

18. The system as claim 17 recites, the operations further comprising:
receiving, from an additional electronic device, an indication that a customer application on the additional electronic device has been accessed, the indication including an additional request regarding an additional order of an item from the merchant;
receiving, from the additional electronic device, third information indicating a third geographic location associated with the additional electronic device;

determining that the third geographic location is within the threshold distance from the merchant; and generating, based at least in part on the third geographic location being within the threshold distance from the merchant, additional fulfillment information that includes the first acquisition option for fulfilling the additional order by delivery and the second acquisition option for fulfilling the additional order by at least one of customer pickup or dine-in.

19. The system as claim 14 recites, the operations further comprising:

determining, based at least in part on the courier shortage state, a first cost associated with fulfilling the order by delivery; and determining, based at least in part on the state, a second cost associated with fulfilling the order by customer pickup, and wherein generating the fulfillment information comprises generating the fulfillment information to further include an indication of the first cost and an indication of the second cost.

20. The system as claim 14, the operations further comprising:

analyzing data describing one or more previous orders received from the electronic device, wherein the data describing a respective previous order of the one or more previous orders indicates whether the respective previous order was fulfilled by customer pickup or fulfilled by delivery; and determining, based at least in part on analyzing the data, a preference for the customer, the preference including that the customer prefers orders fulfilled by pickup or prefers orders fulfilled by delivery, and wherein generating the fulfillment information is further based, at least in part, on the preference of the customer.

* * * * *